US012069702B2

(12) United States Patent
Taherzadeh Boroujeni et al.

(10) Patent No.: US 12,069,702 B2
(45) Date of Patent: Aug. 20, 2024

(54) GROUP COMMON CONTROL FOR COVERAGE ENHANCEMENT FOR UPLINK CONTROL CHANNEL

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 17/313,886

(22) Filed: May 6, 2021

(65) Prior Publication Data

US 2021/0352674 A1 Nov. 11, 2021

Related U.S. Application Data

(60) Provisional application No. 63/022,406, filed on May 8, 2020.

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0695* (2013.01); *H04L 1/0007* (2013.01);
(Continued)

(58) Field of Classification Search
CPC ............. H04W 72/53; H04W 72/0446; H04W 72/0453; H04W 72/21; H04W 72/23;
(Continued)

(56) References Cited

U.S. PATENT DOCUMENTS

2017/0026942 A1\* 1/2017 Vajapeyam ........... H04W 72/23
2017/0265174 A1\* 9/2017 Wang .................. H04W 72/232
(Continued)

OTHER PUBLICATIONS

Molavianjazi et al., "Beam Management and Coverage Enhancements for Semi-Persistent and Configured Grant Transmissions", U.S. Appl. No. 62/947,543, filed Dec. 13, 2019 (Year: 2019).\*
(Continued)

*Primary Examiner* — Thinh D Tran
(74) *Attorney, Agent, or Firm* — Holland & Hart LLP

(57) ABSTRACT

Methods, systems, and devices for wireless communications are described. One method for coverage enhancement may include a base station transmitting control signaling to one or more user equipments (UEs) using a same beam configuration to perform a coverage enhancement procedure for uplink transmissions. In response, one or more UEs may determine one or more transmission parameters for uplink transmission based on the coverage enhancement procedure. In some cases, the coverage enhancement procedure may include the UEs transmitting additional repetitions of an uplink transmission, using additional time or frequency resources, or any combination thereof. In some cases, the UEs may use different coverage enhancement procedures. Accordingly, the one or more UEs may transmit an uplink transmission based on the one or more transmission parameters.

29 Claims, 19 Drawing Sheets

(51) Int. Cl.
*H04L 1/00* (2006.01)
*H04W 72/0446* (2023.01)
*H04W 72/0453* (2023.01)
*H04W 72/21* (2023.01)
*H04W 72/23* (2023.01)

(52) U.S. Cl.
CPC ... *H04W 72/0446* (2013.01); *H04W 72/0453* (2013.01); *H04W 72/21* (2023.01); *H04W 72/23* (2023.01)

(58) Field of Classification Search
CPC .... H04W 72/20; H04B 7/0695; H04L 1/0007; H04L 1/189; H04L 5/0053; H04L 5/0058; H04L 5/006; H04L 1/0072
See application file for complete search history.

(56) References Cited

U.S. PATENT DOCUMENTS

| | | | | |
|---|---|---|---|---|
| 2018/0249383 | A1* | 8/2018 | Martin | H04W 36/0061 |
| 2018/0324780 | A1* | 11/2018 | Novlan | H04L 43/0811 |
| 2020/0187015 | A1* | 6/2020 | Li | H04W 16/18 |
| 2021/0184812 | A1* | 6/2021 | MolavianJazi | H04L 5/0051 |
| 2022/0167432 | A1* | 5/2022 | Lee | H04B 7/0695 |
| 2022/0386383 | A1* | 12/2022 | Li | H04B 7/0695 |
| 2023/0140213 | A1* | 5/2023 | Awadin | H04L 5/0044 370/329 |

OTHER PUBLICATIONS

Awadin et la., "Coverage Enhancement for Reduced Capability New Radio Devices", U.S. Appl. No. 62/992,366, filed Mar. 20, 2020 (Year: 2020).*

* cited by examiner

GROUP COMMON CONTROL FOR COVERAGE ENHANCEMENT FOR UPLINK CONTROL CHANNEL

CROSS REFERENCE

The present Application for Patent claims the benefit of U.S. Provisional Patent Application No. 63/022,406 by TAHERZADEH BOROUJENI et al., entitled "GROUP COMMON CONTROL FOR COVERAGE ENHANCEMENT FOR UPLINK CONTROL CHANNEL," filed May 8, 2020, assigned to the assignee hereof, and expressly incorporated by reference herein.

FIELD OF TECHNOLOGY

The following relates generally to wireless communications and more specifically to group common control for coverage enhancement for uplink control channel(s).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications system may operate in millimeter wave (mmW) frequency ranges and may use beamforming techniques to decrease the effects of path loss between a UE and a base station. In some cases, a beam may become weak or partially blocked, which may lead to a loss of communications. In such cases, performing a beam switching procedure may lead to an inefficient use of resources if the beam is unreliable for a short period of time.

SUMMARY

The described techniques relate to improved methods, systems, devices, and apparatuses that support group common control for coverage enhancement for uplink control channel. Generally, the described techniques may include a base station transmitting control signaling to a user equipment (UE) or a group of UEs using a same beam configuration to perform a coverage enhancement procedure for uplink transmissions. In response, one or more UEs may determine transmission parameters for an uplink control channel transmission based on the coverage enhancement procedure. In some cases, the coverage enhancement procedure may include transmitting additional repetitions of an uplink transmission, using additional or different time or frequency resources for the uplink transmission, or any combination thereof. In some cases, some of the UEs may use different coverage enhancement procedures and the UEs may be provided with a set of coverage enhancement procedures available for use by the UEs. Accordingly, the one or more UEs may transmit an uplink control channel transmission based on the one or more transmission parameters and in accordance with a coverage enhancement procedure.

A method for wireless communications at a UE is described. The method may include receiving, from a base station, a group common control message for a group of UEs including the UE, the group common control message instructing the UE to use a coverage enhancement procedure for an uplink control channel, determining one or more transmission parameters for the uplink control channel based on the coverage enhancement procedure, and transmitting the uplink control channel based on the one or more transmission parameters.

An apparatus for wireless communications at a UE is described. The apparatus may include a processor, memory coupled with the processor, and instructions stored in the memory. The instructions may be executable by the processor to cause the apparatus to receive, from a base station, a group common control message for a group of UEs including the UE, the group common control message instructing the UE to use a coverage enhancement procedure for an uplink control channel, determine one or more transmission parameters for the uplink control channel based on the coverage enhancement procedure, and transmit the uplink control channel based on the one or more transmission parameters.

Another apparatus for wireless communications at a UE is described. The apparatus may include means for receiving, from a base station, a group common control message for a group of UEs including the UE, the group common control message instructing the UE to use a coverage enhancement procedure for an uplink control channel, means for determining one or more transmission parameters for the uplink control channel based on the coverage enhancement procedure, and means for transmitting the uplink control channel based on the one or more transmission parameters.

A non-transitory computer-readable medium storing code for wireless communications at a UE is described. The code may include instructions executable by a processor to receive, from a base station, a group common control message for a group of UEs including the UE, the group common control message instructing the UE to use a coverage enhancement procedure for an uplink control channel, determine one or more transmission parameters for the uplink control channel based on the coverage enhancement procedure, and transmit the uplink control channel based on the one or more transmission parameters.

In some examples of the method, apparatuses, and non-transitory computer-readable medium described herein, determining one or more transmission parameters may include operations, features, means, or instructions for determining a number of repetitions of the uplink control channel based on the coverage enhancement procedure, where the coverage enhancement procedure may be to use an increased number of repetitions relative to transmission without the coverage enhancement procedure.

In some examples of the method, apparatuses, and non-transitory computer-readable medium described herein, determining one or more transmission parameters may include operations, features, means, or instructions for determining a set of time-frequency resources for transmission of the uplink control channel based on the coverage enhancement procedure, where the coverage enhancement procedure may be to use different or additional time-frequency resources relative to transmission without the coverage enhancement procedure.

In some examples of the method, apparatuses, and non-transitory computer-readable medium described herein, determining one or more transmission parameters may include operations, features, means, or instructions for determining a payload size of uplink control information (UCI) or an uplink control format of the uplink control channel based on the coverage enhancement procedure, where the coverage enhancement procedure may be to use a smaller payload size or a different uplink control format relative to transmission without the coverage enhancement procedure.

In some examples of the method, apparatuses, and non-transitory computer-readable medium described herein, determining one or more transmission parameters may include operations, features, means, or instructions for determining the one or more transmission parameters based on a content of the uplink control channel.

Some examples of the method, apparatuses, and non-transitory computer-readable medium described herein may further include operations, features, means, or instructions for determining a number of repetitions of the uplink control channel based on the content of the uplink control channel, where the content of the uplink control channel includes an acknowledgement of a beam change, a scheduling request, or any combination thereof, and where the coverage enhancement procedure may be to use an increased number of repetitions relative to transmission without the coverage enhancement procedure.

Some examples of the method, apparatuses, and non-transitory computer-readable medium described herein may further include operations, features, means, or instructions for determining a number of repetitions of the uplink control channel based on the content of the uplink control channel, where the content of the uplink control channel may be associated with a semi-persistent scheduling configuration.

Some examples of the method, apparatuses, and non-transitory computer-readable medium described herein may further include operations, features, means, or instructions for determining a set of time-frequency resources for transmission of the uplink control channel based on a priority of the semi-persistent scheduling configuration, where the coverage enhancement procedure may be to use different or additional time-frequency resources relative to transmission without the coverage enhancement procedure.

Some examples of the method, apparatuses, and non-transitory computer-readable medium described herein may further include operations, features, means, or instructions for receiving, from the base station, a configuration indicating a set of coverage enhancement procedures for the UE, the set of coverage enhancement procedures including a default coverage enhancement procedure and the coverage enhancement procedure.

Some examples of the method, apparatuses, and non-transitory computer-readable medium described herein may further include operations, features, means, or instructions for transmitting a second uplink control channel in accordance with the default coverage enhancement procedure prior to receiving the group common control message.

In some examples of the method, apparatuses, and non-transitory computer-readable medium described herein, the configuration may be received via radio resource control (RRC) signaling.

In some examples of the method, apparatuses, and non-transitory computer-readable medium described herein, the group common control message includes group common downlink control information (DCI).

A method for wireless communications at a base station is described. The method may include determining a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel and transmitting a configuration indicating the set of coverage enhancement procedures to the UE.

An apparatus for wireless communications at a base station is described. The apparatus may include a processor, memory coupled with the processor, and instructions stored in the memory. The instructions may be executable by the processor to cause the apparatus to determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel, and transmit a configuration indicating the set of coverage enhancement procedures to the UE.

Another apparatus for wireless communications at a base station is described. The apparatus may include means for determining a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel and means for transmitting a configuration indicating the set of coverage enhancement procedures to the UE.

A non-transitory computer-readable medium storing code for wireless communications at a base station is described. The code may include instructions executable by a processor to determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel and transmit a configuration indicating the set of coverage enhancement procedures to the UE.

Some examples of the method, apparatuses, and non-transitory computer-readable medium described herein may further include operations, features, means, or instructions for transmitting a group common control message to the UE that instructs the UE to use the secondary coverage enhancement procedure for transmission of the uplink control channel and receiving the uplink control channel from the UE in accordance with the secondary coverage enhancement procedure.

Some examples of the method, apparatuses, and non-transitory computer-readable medium described herein may further include operations, features, means, or instructions for receiving a number of repetitions of the uplink control channel from the UE based on the secondary coverage enhancement procedure, where the secondary coverage enhancement procedure may be to use an increased number of repetitions relative to the default coverage enhancement procedure.

In some examples of the method, apparatuses, and non-transitory computer-readable medium described herein, the number of repetitions of the uplink control channel may be based on a content of the uplink control channel, and the content may be associated with a semi-persistent scheduling configuration or may include an acknowledgement of a beam change, a scheduling request, or any combination thereof.

In some examples of the method, apparatuses, and non-transitory computer-readable medium described herein, a set of time-frequency resources for reception of the uplink control channel may be based on the secondary coverage enhancement procedure, and the secondary coverage enhancement procedure may be to use different or additional resources relative to the default coverage enhancement procedure.

In some examples of the method, apparatuses, and non-transitory computer-readable medium described herein, a payload size of UCI or an uplink control format of the uplink control channel may be based on the secondary coverage enhancement procedure, and the secondary coverage enhancement procedure may be to use a smaller payload size or different uplink control format relative to the default coverage enhancement procedure.

In some examples of the method, apparatuses, and non-transitory computer-readable medium described herein, transmitting the configuration may include operations, features, means, or instructions for transmitting an RRC message that includes the configuration.

DETAILED DESCRIPTION

Figure 1:
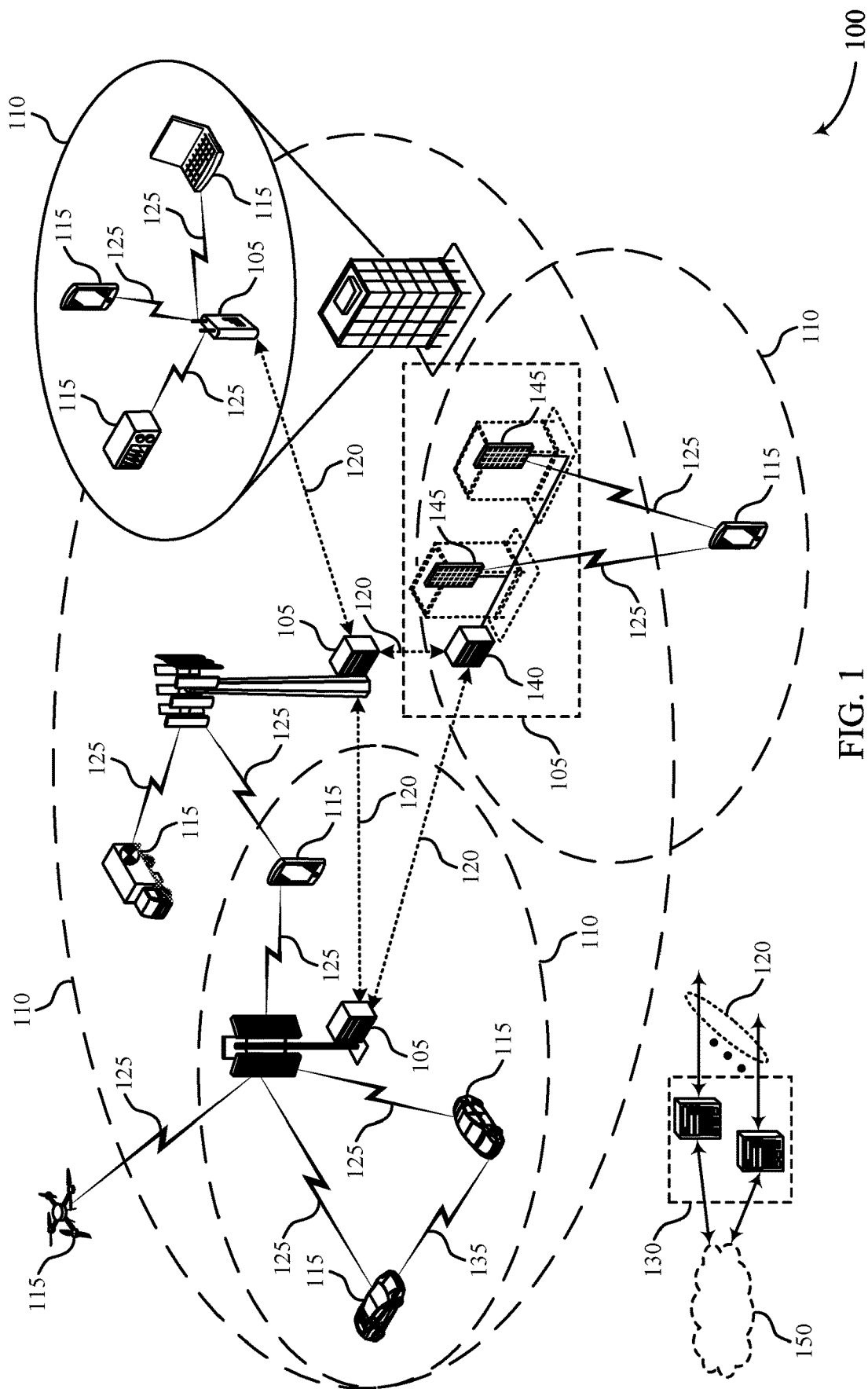
FIGS. 1 and 2 illustrate examples of wireless communications systems that support group common control for coverage enhancement for uplink control channel in accordance with aspects of the present disclosure.

Some wireless communications systems may operate in millimeter wave (mmW) frequency ranges (e.g., 28 gigahertz (GHz), 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques such as beamforming may be used to overcome the path losses at these frequencies. Accordingly, transmissions from a base station or a user equipment (UE) may be beamformed and a receiving device may use beamforming techniques to configure antenna(s) or antenna array(s) such that transmissions are received in a directional manner. In some cases, a UE may select an active beam for communication with a network by selecting the strongest beam from a number of candidate beams. In some cases, multiple UEs (such as UEs within a group) may use a same beam configuration.

In some cases, wireless communications systems, such as those operating in the mmW frequency ranges, may experience a loss of communications due to a beam becoming weak or partially blocked. If a beam becomes weak, a base station may perform a beam switching procedure to determine a strong beam for communications. However, in some examples, the beam may be weak for a short period of time, such that performing a beam switching procedure may lead to inefficient use of processing resources or may take longer than the time for which the beam is weakened. Further, it may be beneficial for a base station to maintain communication with the UE in order to determine a beam for selection. For example, it may be important for the base station to receive channel state information (CSI) feedback from a UE in order to determine a beam for selection. In some cases, maintaining communication with the UE may include maintaining a performance threshold on a unicast channel (e.g., a physical uplink control channel (PUCCH)). To maintain communication in the case of a beam becoming unreliable, it may be beneficial to provide a method for coverage enhancement for the uplink control channel, which may be enabled more dynamically and, in some cases, in lieu of a beam switching or other beam management procedure.

According to the techniques herein, a base station may transmit control signaling to one or more UEs (e.g., UEs within a group, which may use a same beam configuration) instructing the UEs to perform coverage enhancement for uplink transmissions. In some cases, the instructions to perform coverage enhancement may be included in a group-common downlink control information (DCI) and the control signaling may be used to indicate a dynamic adjustment of a coverage enhancement technique. For example, such an indication may instruct a UE to switch from a default transmission mode (e.g., without coverage enhancement) to a transmission mode that uses coverage enhancement. In some cases, the indication may instruct the UE to switch from a default coverage enhancement technique to a different coverage enhancement technique. In some cases, the indication may inform the UE of a type of coverage enhancement to use.

In response to instructions to perform coverage enhancement, a UE may determine one or more transmission parameters to use for uplink transmission. In some examples, the transmission parameters may be applied to PUCCH transmissions. The one or more transmission parameters may be based on a coverage enhancement technique used by the UE (e.g., as instructed by the base station). In some examples, a coverage enhancement technique may include the UE repeating uplink transmissions, using additional time or frequency resources, or any combination thereof. In some cases, the coverage enhancement technique may be based on a size of an uplink transmission (e.g., an uplink control information (UCI) transmission). In some cases, the coverage enhancement technique may be based on the content of an uplink transmission or an associated procedure. For example, a coverage enhancement technique may be based on the uplink transmission including a beam-change acknowledgement message, a scheduling request, a message associated with a semi-persistent scheduling configuration, or any combination thereof. In some cases, UEs in a group may use different coverage enhancement techniques based on instructions received from the base station. Implementing various aspects of the present disclosure may increase the reliability of uplink transmissions received by the base station in the case of a beam becoming unreliable.

Aspects of the disclosure are initially described in the context of wireless communications systems and a process flow. Aspects of the disclosure are further illustrated by and described with reference to apparatus diagrams, system diagrams, and flowcharts that relate to group common control for coverage enhancement for uplink control channel.

FIG. 1 illustrates an example of a wireless communications system 100 that supports group common control for coverage enhancement for uplink control channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UEs 115 and the base stations 105 may use beamforming techniques to minimize effects of path loss. In such examples, a beam may become weak or partially blocked, which may lead to a loss in communications. In some cases, the beam may be unreliable for a short period of time. In such cases, performing a beam switching procedure may lead to an inefficient use of resources. Accordingly, the base stations 105 may transmit control signaling to the UEs 115 instructing the UEs 115 to perform a coverage enhancement procedure to maintain reliable communications, which may enable the base stations 105 to more dynamically signal coverage enhancement techniques for uplink control channels to the UEs 115.

One or more of the UEs 115 may determine transmission parameters for uplink transmission based on the coverage enhancement procedure. In some cases, the coverage enhancement procedure may include the UEs 115 transmitting additional repetitions of the uplink transmission, using additional time or frequency resources for the transmission, or any combination thereof. In some cases, the uplink transmission may be a PUCCH transmission (e.g., including UCI). In some examples, the coverage enhancement procedure used by the UEs 115 may be based on the content of the uplink transmission. In some cases, UEs 115 may use different coverage enhancement techniques. Implementing various aspects of the present disclosure may allow for reliable communications between the base stations 105 and the UEs 115 in response to detecting an unreliable beam.

Figure 2:
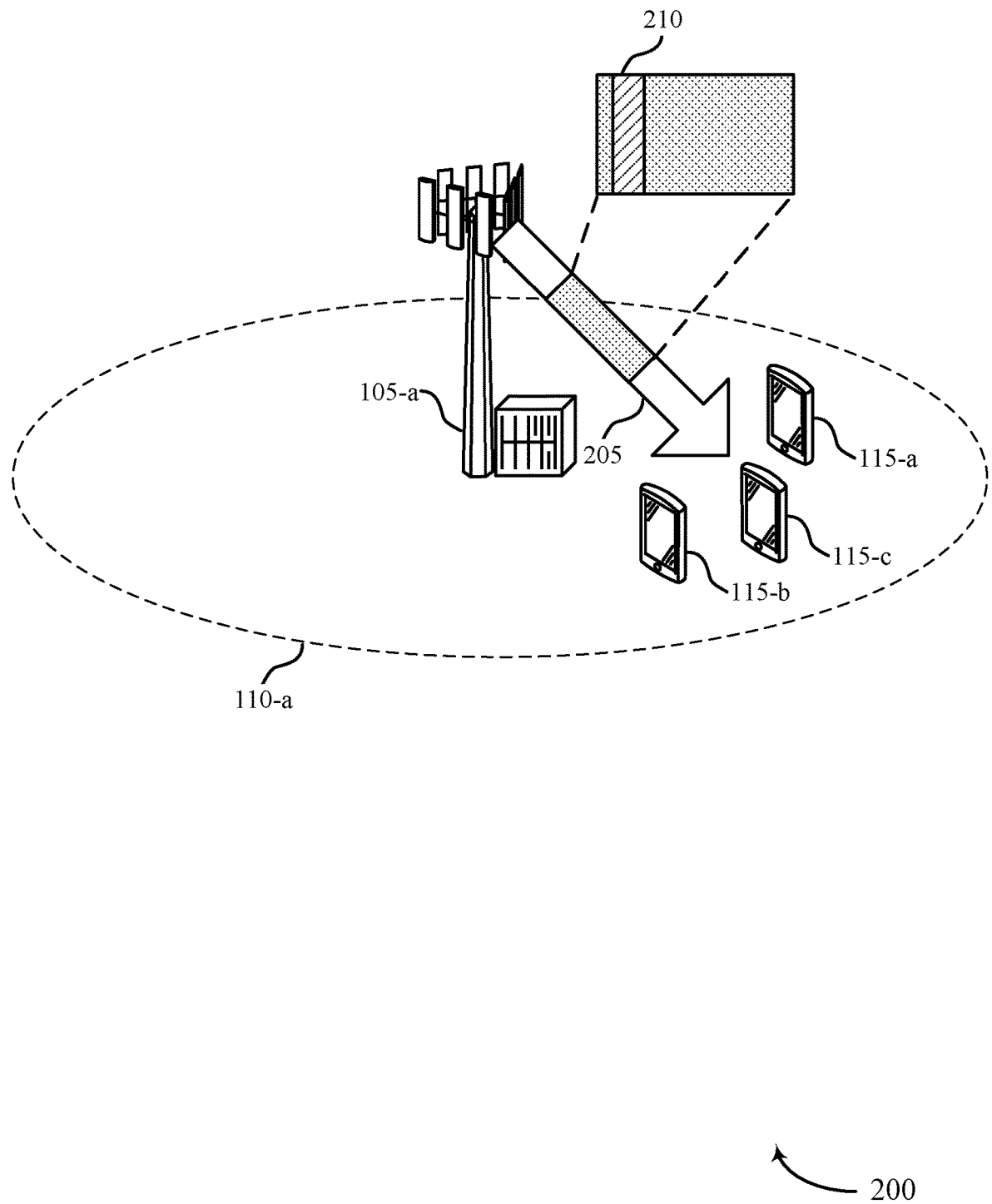

FIG. 2 illustrates an example of a wireless communications system 200 that supports group common control for coverage enhancement, in accordance with one or more aspects of the present disclosure. In some cases, the wireless communications system 200 may implement aspects of a wireless communications system 100. The wireless communications system 200 may include a UE 115-a, a UE 115-b, and a UE 115-c, which may be examples of a UE 115 as described with reference to FIG. 1. The wireless communications system 200 may also include a base station 105-a, which may be an example of a base station 105 as described with reference to FIG. 1. The base station 105 may be associated with a cell which provides wireless communications service within a respective coverage area 110-a.

According to some aspects, the base station 105-a may transmit control information to the UEs 115-a, 115-b, and 115-c on a downlink channel 205. In some cases, the wireless communications system 200 may operate in mmW frequency ranges and the UEs 115 and the base station 105 may use beamforming for downlink and uplink communications. In some examples, the UEs 115-a, 115-b, and 115-c may use a same beam configuration for uplink transmission.

In response to detecting a weak beam, the base station 105-a may transmit control signaling 210 instructing one or more of the UEs 115-a, 115-b, and 115-c to perform a coverage enhancement technique for uplink transmission (e.g., an uplink control channel transmission). In some cases, the control signaling may consist of a group common DCI. In some cases, the control signaling may include an indicator 215 instructing one or more of the UEs 115-a, 115-b, and 115-c to dynamically adjust a coverage enhancement technique. For example, the indicator 215 may instruct one or more of the UEs 115-a, 115-b, and 115-c to switch from a default transmission mode (e.g., with no coverage enhancement) to a transmission mode that uses a coverage enhancement technique. Additionally, or alternatively, the indicator 215 may instruct one or more of the UEs 115-a, 115-b, and 115-c to switch from a first coverage enhancement technique to a second coverage enhancement technique. In some cases, the indicator 215 may instruct one or more of the UEs 115-a, 115-b, and 115-c to use a given coverage enhancement technique of a set of coverage enhancement techniques available for use by and configured for one or more of the UEs 115-a, 115-b, and 115-c.

In response to receiving the indicator 215, the UE 115-a may determine one or more transmission parameters to use for uplink transmission. In some cases, the transmission parameters may be associated with PUCCH transmissions (e.g., including UCI). The transmission parameters may be based on a coverage enhancement technique used by the UE 115-a. In some cases, the coverage enhancement technique may include the UE 115-a determining to repeat uplink transmissions. In some examples, the UE 115-a may repeat an uplink transmission periodically for a configured amount of time. Additionally, or alternatively, the UE 115-a may transmit a configured number of repetitions of an uplink transmission. In some examples, the coverage enhancement technique may include the UE 115-a using additional time or frequency resources for the uplink transmission. In some cases, the coverage enhancement technique used by the UE 115-a may be based on a size of the uplink transmission. In some examples, the coverage enhancement technique may include the UE 115-a transmitting an uplink transmission of a reduced size. In some cases, applying the coverage enhancement technique may be based on a format of the uplink transmission.

In some cases, the coverage enhancement technique used by the UE 115-a may be based on a content of the uplink control channel. For example, the coverage enhancement technique may be based on the uplink control channel including a beam-change feedback message (e.g., a beam acknowledgement (ACK) message). For example, if the uplink control channel includes a beam-change feedback message, a coverage enhancement procedure may include sending additional repetitions of the uplink transmission.

In some examples, the base station 105-a may instruct the UE 115-a to perform a coverage enhancement procedure if the uplink control channel includes a scheduling request. In some cases, the coverage enhancement procedure may include sending additional repetitions of the uplink transmission. Additionally, or alternatively, the coverage enhancement procedure may include using additional allocated time or frequency resources. In some cases, applying a coverage enhancement technique may be based on a priority of the uplink control channel.

In some cases, coverage enhancement technique may be based on a priority associated with a semi-persistent scheduling configuration for the uplink transmission. For example, the base station 105-a may instruct the UE 115-a to perform a coverage enhancement procedure for transmissions using the semi-persistent scheduling configurations, but not for other transmissions. Accordingly, any of UEs 115-a, 115-b, and 115-c may perform a coverage enhancement technique if there are uplink control channel transmissions associated with the semi-persistent scheduling configuration. In some cases, if the uplink control channel transmissions have a high priority configured for semi-persistent scheduling, the UE 115-a may use additional allocated resources for the transmission.

In some examples, UEs 115-a, 115-b, and 115-c may use different coverage enhancement techniques. In some cases, the indicator 215 transmitted by the base station 105-a may include different instructions for the UEs 115-a, 115-b, and 115-c. For example, the indicator 215 may include an indication of different coverage enhancement techniques to be used by the UEs 115-*a*, 115-*b*, and 115-*c*. Various aspects of the present disclosure may be implemented to provide reliable communications between one or more of the UEs 115-*a*, 115-*b*, and 115-*c* and the base station 105-*a* in the event of detecting a weak beam.

Figure 3:
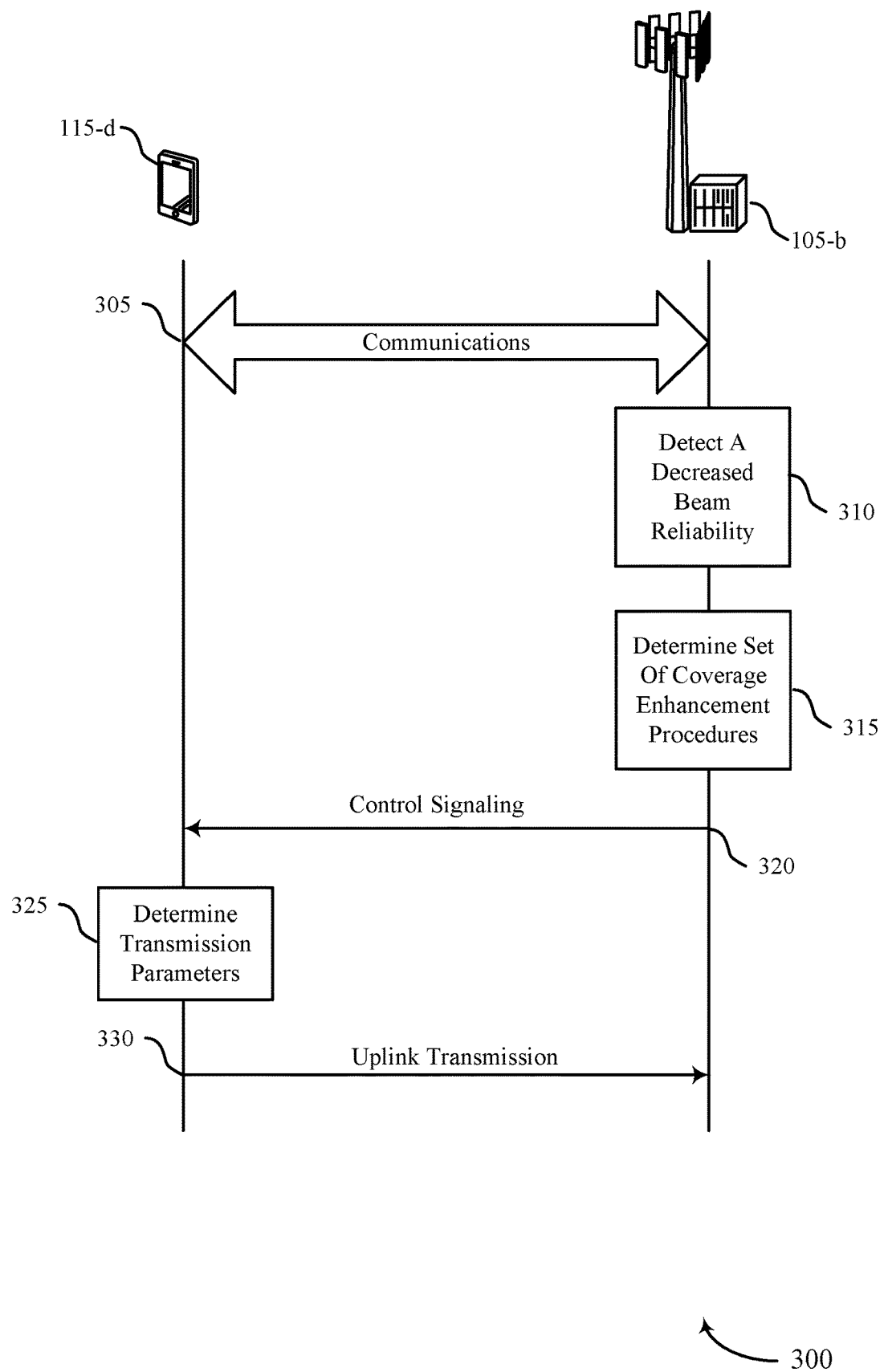
FIG. 3 illustrates an example of a process flow that supports group common control for coverage enhancement for uplink control channel in accordance with aspects of the present disclosure.

FIG. 3 illustrates an example of a process flow 300 that supports group common control for coverage enhancement, in accordance with one or more aspects of the present disclosure. In some examples, the process flow 300 may implement aspects of the wireless communications systems 100 or 200. The process flow 300 may include a UE 115-*d* and a base station 105-*b*, which may be examples of the corresponding devices described herein. Alternative examples of the following may be implemented, where some process are performed in a different order than described or are not performed at all. In some cases, processes may include additional features not mentioned below, or further processes may be added.

At 305, the UE 115-*d* and the base station 105-*b* may perform wireless communications using beamforming techniques. In some cases, the wireless communications may include UCI transmitted using a default transmission mode that does not include coverage enhancement techniques.

At 310, the base station 105-*b* may detect a decreased beam reliability for the UE 115-*d*. In some cases, the reliability of the beam may be decreased for a short period of time.

At 315, the base station 105-*b* may determine a set of coverage enhancement procedures. In some case, the set of coverage enhancement procedures may include a primary coverage enhancement procedure and a secondary coverage enhancement procedure.

At 320, the base station 105-*b* may transmit a control message instructing the UE 115-*d* to use a coverage enhancement procedure for uplink control channel transmissions (e.g., a PUCCH). In some cases, the control message may indicate the set of coverage enhancement procedures to the UE 115-*d* or the set of coverage enhancement procedure may be indicated to the UE 115-*d* prior to the control message, or the UE 115-*d* may be otherwise preconfigured with the set of coverage enhancement procedures. In some cases, the indication may be transmitted as part of a group common DCI message. In some examples, the indication may be included in an RRC message.

At 325, the UE 115-*d* may determine one or more transmission parameters for uplink transmission. The one or more transmission parameters may be based on the indicated set of coverage enhancement procedures. In some cases, the set of coverage enhancement procedures may include repetitive transmission, additional time or frequency resources, or any combination thereof. In some cases, the set of coverage enhancement procedures may be based on a size of an uplink transmission, content of an uplink transmission, a format of an uplink transmission, or any combination thereof.

At 330, the UE 115-*d* may transmit an uplink transmission. In some cases, the uplink transmission may be a PUCCH transmission (e.g., a UCI transmission).

Implementing one or aspects of the process flow 300 may allow for reliable uplink transmissions from a UE 115-*d* to a base station 105-*b* in the event of decreased beam reliability.

Figure 4:
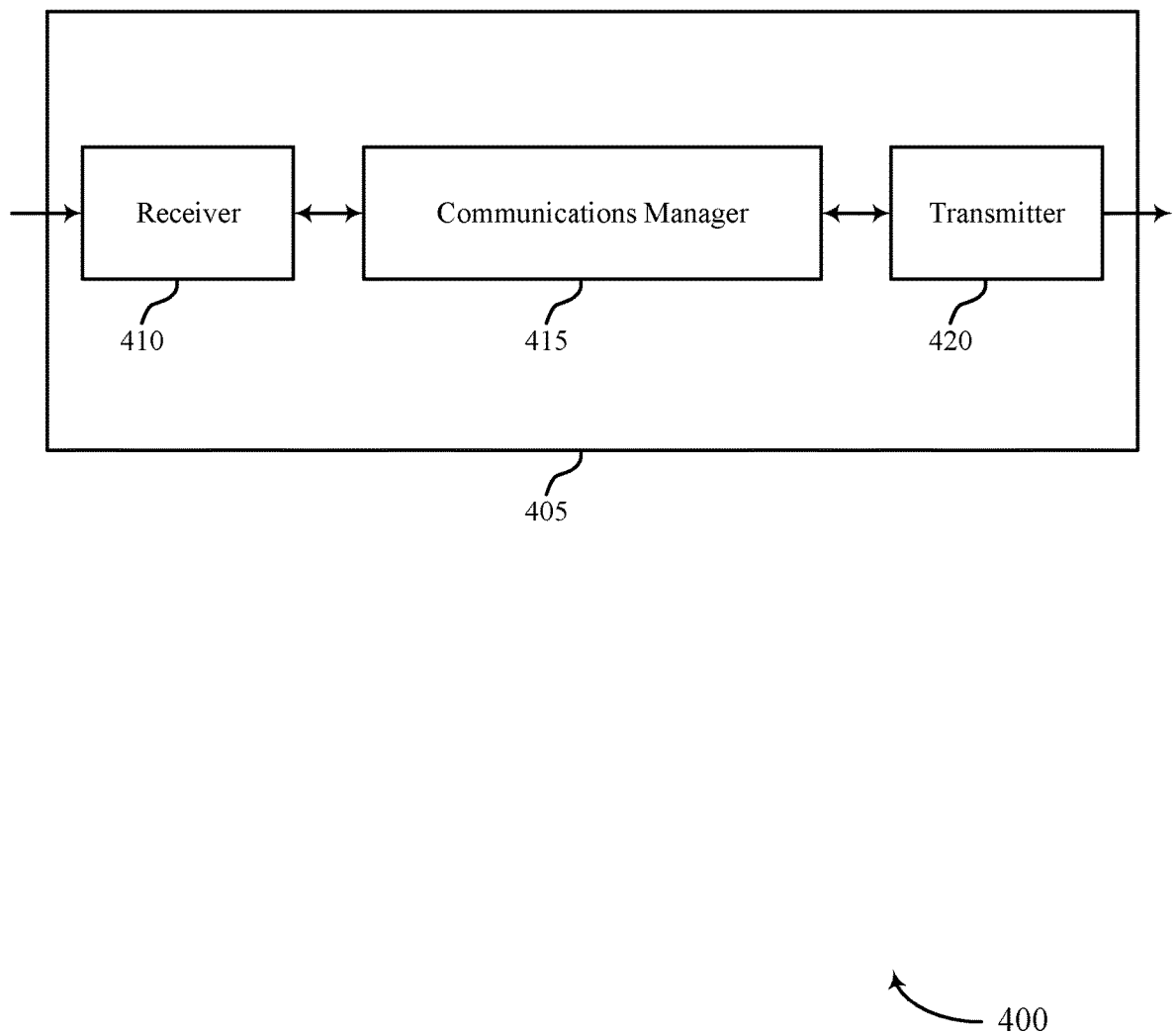
FIGS. 4 and 5 show block diagrams of devices that support group common control for coverage enhancement for uplink control channel in accordance with aspects of the present disclosure.

FIG. 4 shows a block diagram 400 of a device 405 that supports group common control for coverage enhancement for uplink control channel in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to group common control for coverage enhancement for uplink control channel, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, a group common control message for a group of UEs including the UE, the group common control message instructing the UE to use a coverage enhancement procedure for an uplink control channel, determine one or more transmission parameters for the uplink control channel based on the coverage enhancement procedure, and transmit the uplink control channel based on the one or more transmission parameters. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to provide coverage enhancement for uplink transmissions. Based on the techniques for providing coverage enhancement for uplink transmissions, the device 405 may support more reliable communications in the case of a beam becoming unreliable, thereby providing more efficient use of processing resources at the device 405.

As a result, the device 405 may increase a likelihood of a base station accurately decoding an uplink control channel and, accordingly, may communicate over the channel with a greater likelihood of successful communications. In some examples, the device 405 may more efficiently use processing resources based on providing coverage enhancement instead of performing a beam switching procedure. Accordingly, the device 405 may save power, or may dedicate processing resources to other tasks. In some cases, supporting reliable communications may allow a base station to use resources more efficiently when performing beam switching procedure based on providing reliable feedback associated with channel conditions.

Figure 5:
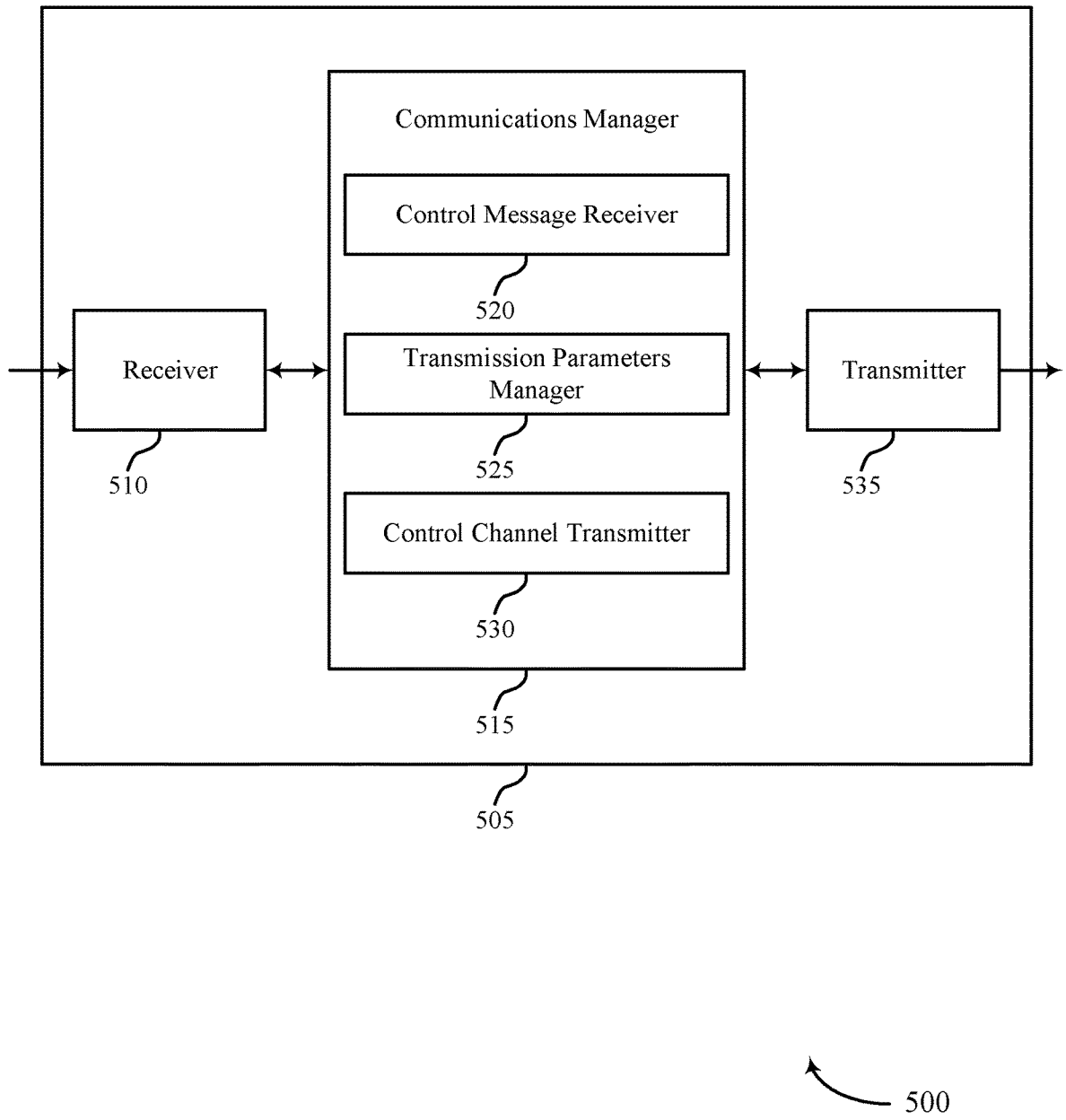

FIG. 5 shows a block diagram 500 of a device 505 that supports group common control for coverage enhancement for uplink control channel in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to group common control for coverage enhancement for uplink control channel, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control message receiver 520, a transmission parameters manager 525, and a control channel transmitter 530. The communications manager 515 may be an example of aspects of the communications manager 710 described herein.

The control message receiver 520 may receive, from a base station, a group common control message for a group of UEs including the UE, the group common control message instructing the UE to use a coverage enhancement procedure for an uplink control channel.

The transmission parameters manager 525 may determine one or more transmission parameters for the uplink control channel based on the coverage enhancement procedure.

The control channel transmitter 530 may transmit the uplink control channel based on the one or more transmission parameters.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
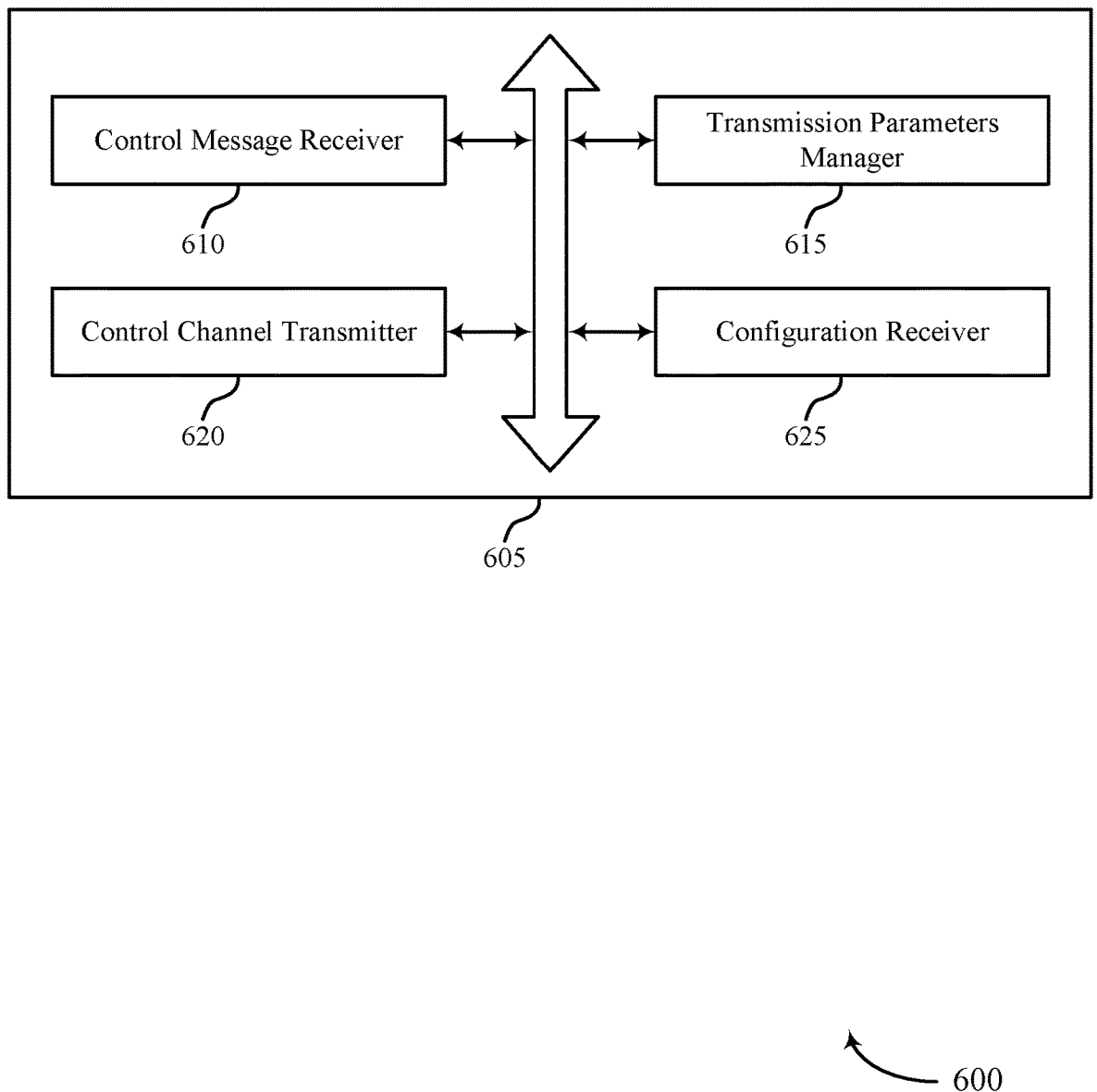
FIG. 6 shows a block diagram of a communications manager that supports group common control for coverage enhancement for uplink control channel in accordance with aspects of the present disclosure.

FIG. 6 shows a block diagram 600 of a communications manager 605 that supports group common control for coverage enhancement for uplink control channel in accordance with aspects of the present disclosure. The communications manager 605 may be an example of aspects of a communications manager 415, a communications manager 515, or a communications manager 710 described herein. The communications manager 605 may include a control message receiver 610, a transmission parameters manager 615, a control channel transmitter 620, and a configuration receiver 625. Each of these modules may communicate, directly or indirectly, with one another (e.g., via one or more buses).

The control message receiver 610 may receive, from a base station, a group common control message for a group of UEs including the UE, the group common control message instructing the UE to use a coverage enhancement procedure for an uplink control channel. In some cases, the group common control message may include a group common DCI.

The transmission parameters manager 615 may determine one or more transmission parameters for the uplink control channel based on the coverage enhancement procedure.

In some examples, the transmission parameters manager 615 may determine a number of repetitions of the uplink control channel based on the coverage enhancement procedure, where the coverage enhancement procedure is to use an increased number of repetitions relative to transmission without the coverage enhancement procedure.

In some examples, the transmission parameters manager 615 may determine a set of time-frequency resources for transmission of the uplink control channel based on the coverage enhancement procedure, where the coverage enhancement procedure is to use different or additional time-frequency resources relative to transmission without the coverage enhancement procedure.

In some examples, the transmission parameters manager 615 may determine a payload size of UCI or an uplink control format of the uplink control channel based on the coverage enhancement procedure, where the coverage enhancement procedure is to use a smaller payload size or a different uplink control format relative to transmission without the coverage enhancement procedure.

In some examples, the transmission parameters manager 615 may determine the one or more transmission parameters based on a content of the uplink control channel.

In some examples, determining a number of repetitions of the uplink control channel is based on the content of the uplink control channel, where the content of the uplink control channel includes an acknowledgement of a beam change, a scheduling request, or any combination thereof, where the coverage enhancement procedure is to use an increased number of repetitions relative to transmission without the coverage enhancement procedure.

In some examples, the transmission parameters manager 615 may determine a number of repetitions of the uplink control channel based on the content of the uplink control channel, where the content of the uplink control channel is associated with a semi-persistent scheduling configuration.

In some examples, the transmission parameters manager 615 may determine a set of time-frequency resources for transmission of the uplink control channel based on a priority of the semi-persistent scheduling configuration, where the coverage enhancement procedure is to use different or additional time-frequency resources relative to transmission without the coverage enhancement procedure.

The control channel transmitter 620 may transmit the uplink control channel based on the one or more transmission parameters.

In some examples, the control channel transmitter 620 may transmit a second uplink control channel in accordance with the default coverage enhancement procedure prior to receiving the group common control message.

The configuration receiver 625 may receive, from the base station, a configuration indicating a set of coverage enhancement procedures for the UE, the set of coverage enhancement procedures including a default coverage enhancement procedure and the coverage enhancement procedure. In some cases, the configuration is received via RRC signaling.

Figure 7:
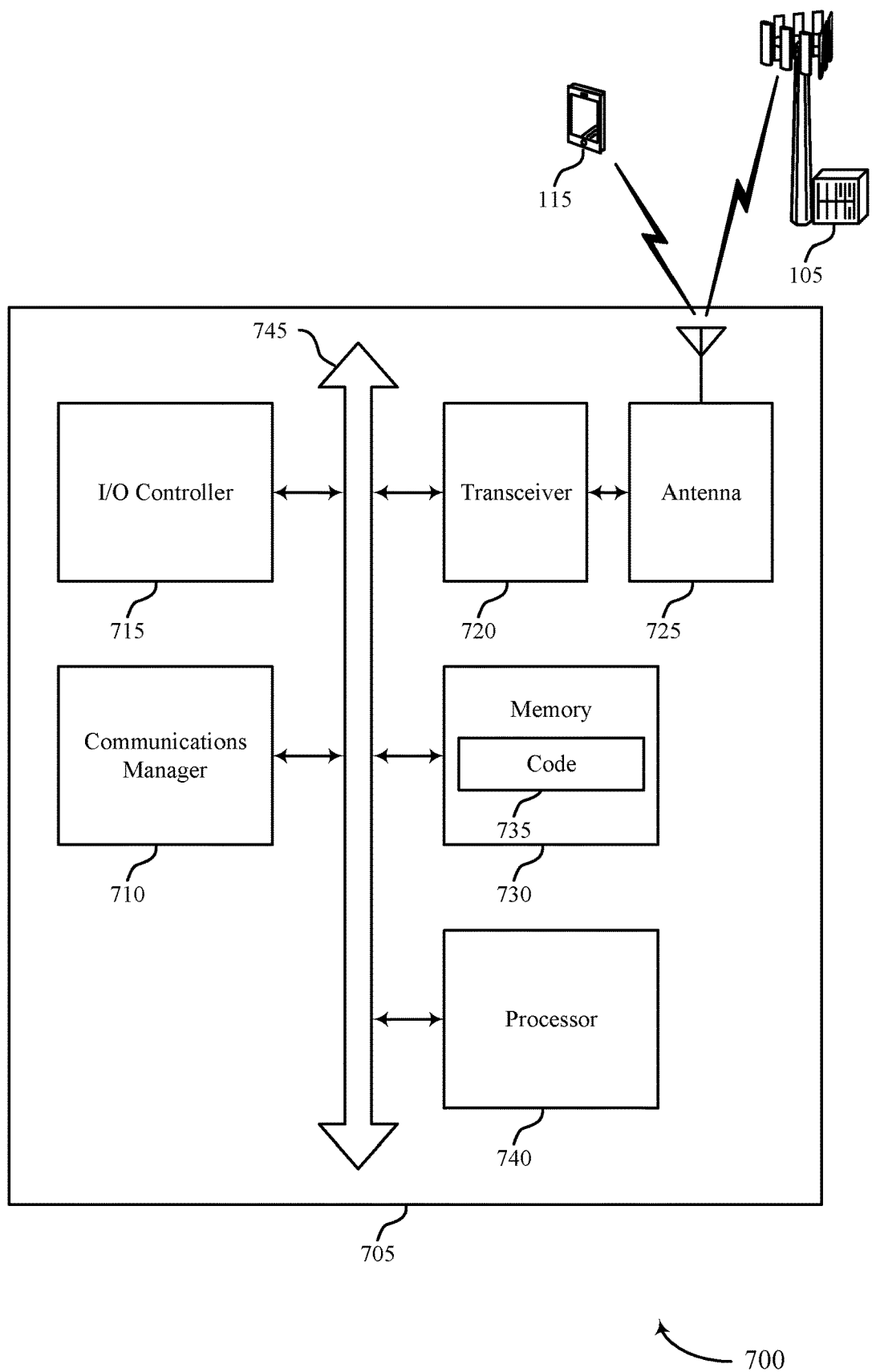
FIG. 7 shows a diagram of a system including a device that supports group common control for coverage enhancement for uplink control channel in accordance with aspects of the present disclosure.

FIG. 7 shows a diagram of a system 700 including a device 705 that supports group common control for coverage enhancement for uplink control channel in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, a group common control message for a group of UEs including the UE, the group common control message instructing the UE to use a coverage enhancement procedure for an uplink control channel, determine one or more transmission parameters for the uplink control channel based on the coverage enhancement procedure, and transmit the uplink control channel based on the one or more transmission parameters.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting group common control for coverage enhancement for uplink control channel).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
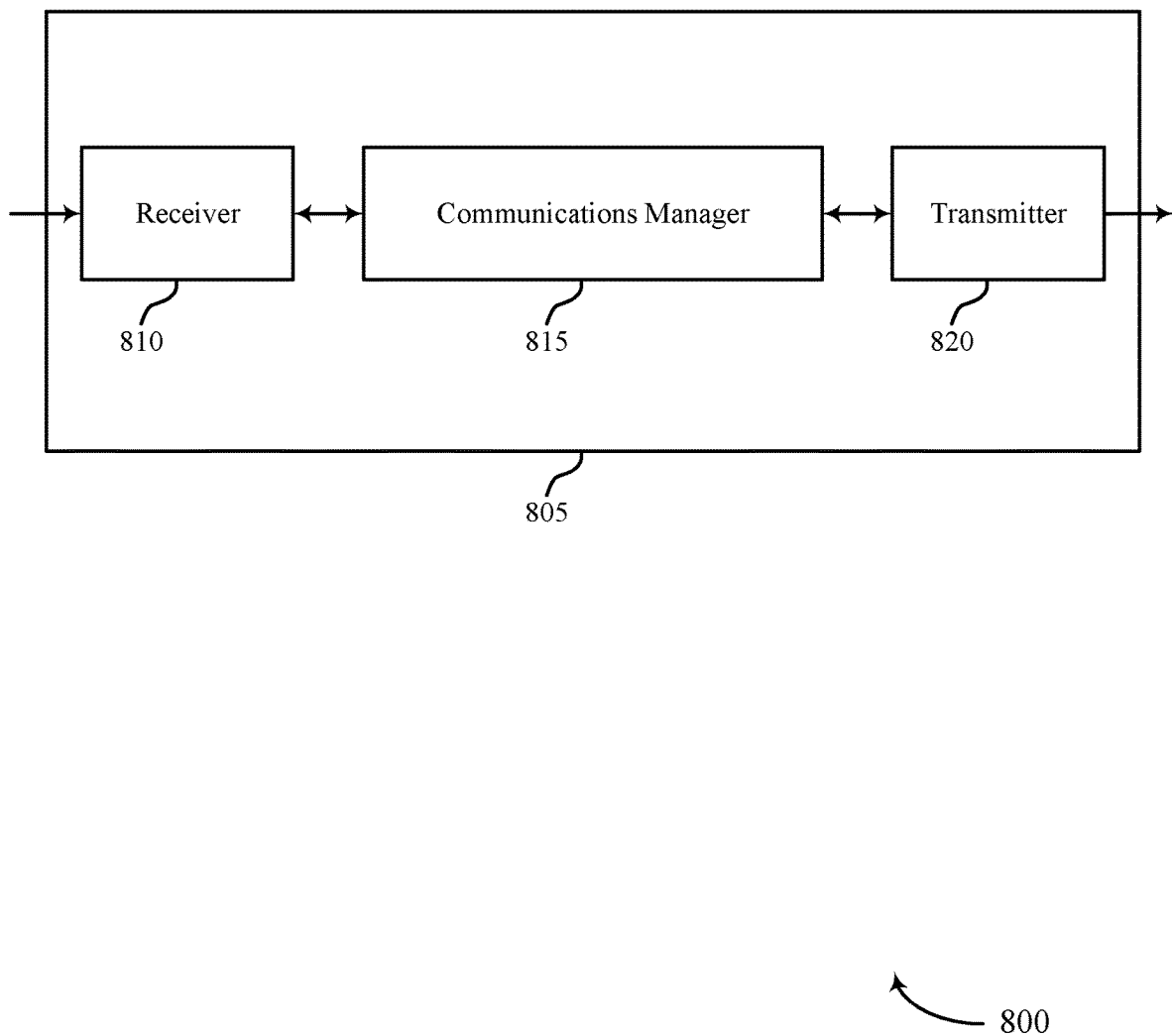
FIGS. 8 and 9 show block diagrams of devices that support group common control for coverage enhancement for uplink control channel in accordance with aspects of the present disclosure.

FIG. 8 shows a block diagram 800 of a device 805 that supports group common control for coverage enhancement for uplink control channel in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to group common control for coverage enhancement for uplink control channel, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel, and transmit a configuration indicating the set of coverage enhancement procedures to the UE. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
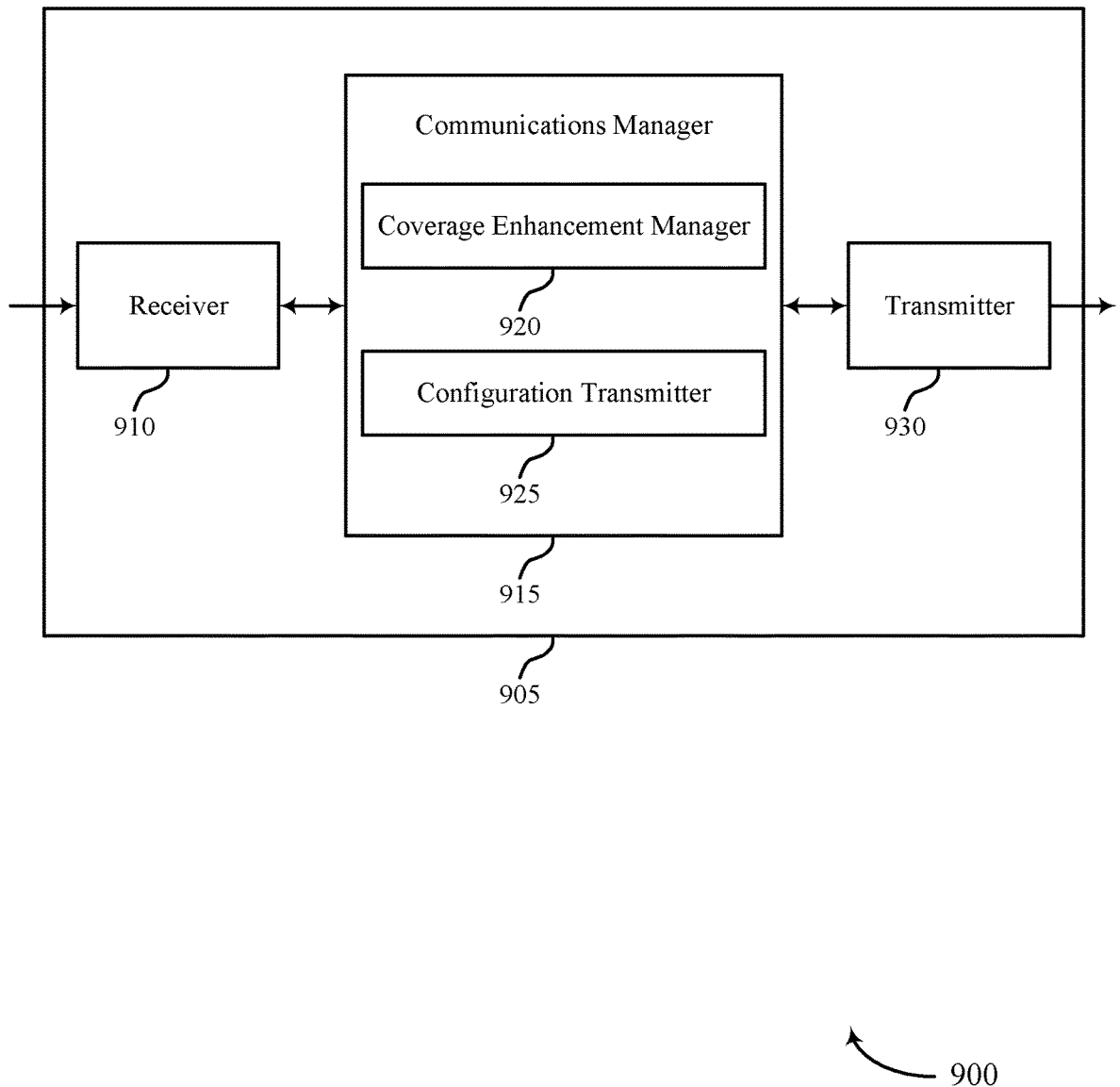

FIG. 9 shows a block diagram 900 of a device 905 that supports group common control for coverage enhancement for uplink control channel in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to group common control for coverage enhancement for uplink control channel, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a coverage enhancement manager 920 and a configuration transmitter 925. The communications manager 915 may be an example of aspects of the communications manager 1110 described herein. The communications manager 915 as described herein may be implemented to realize one or more potential advantages. One implementation may allow the device 905 to provide coverage enhancement for uplink transmissions. Based on the techniques for providing coverage enhancement for uplink transmissions, the device 905 may support more reliable communications in the case of a beam becoming unreliable, thereby providing more efficient use of processing resources at the device 905.

The coverage enhancement manager 920 may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel.

The configuration transmitter 925 may transmit a configuration indicating the set of coverage enhancement procedures to the UE.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
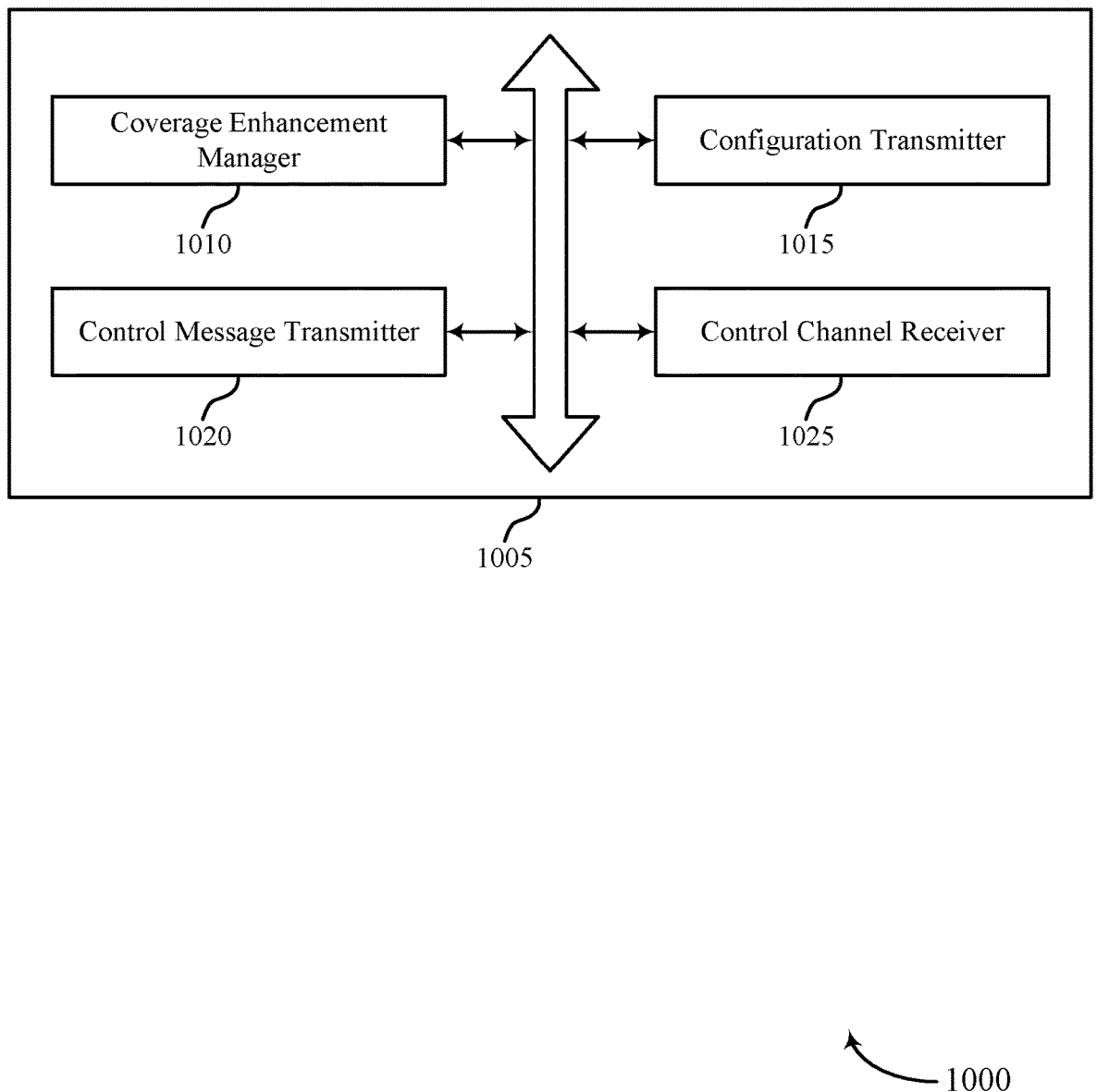
FIG. 10 shows a block diagram of a communications manager that supports group common control for coverage enhancement for uplink control channel in accordance with aspects of the present disclosure.

FIG. 10 shows a block diagram 1000 of a communications manager 1005 that supports group common control for coverage enhancement for uplink control channel in accordance with aspects of the present disclosure. The communications manager 1005 may be an example of aspects of a communications manager 815, a communications manager 915, or a communications manager 1110 described herein. The communications manager 1005 may include a coverage enhancement manager 1010, a configuration transmitter 1015, a control message transmitter 1020, and a control channel receiver 1025. Each of these modules may communicate, directly or indirectly, with one another (e.g., via one or more buses).

The coverage enhancement manager 1010 may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel.

The configuration transmitter 1015 may transmit a configuration indicating the set of coverage enhancement procedures to the UE. In some examples, the configuration transmitter 1015 may transmit an RRC message that includes the configuration.

The control message transmitter 1020 may transmit a group common control message to the UE that instructs the UE to use the secondary coverage enhancement procedure for transmission of the uplink control channel.

The control channel receiver 1025 may receive the uplink control channel from the UE in accordance with the secondary coverage enhancement procedure.

In some examples, the control channel receiver 1025 may receive a number of repetitions of the uplink control channel from the UE based on the secondary coverage enhancement procedure, where the secondary coverage enhancement procedure is to use an increased number of repetitions relative to the default coverage enhancement procedure. In some cases, the number of repetitions of the uplink control channel is based on a content of the uplink control channel.

In some cases, the content is associated with a semi-persistent scheduling configuration or includes an acknowledgement of a beam change, a scheduling request, or any combination thereof. In some cases, a set of time-frequency resources for reception of the uplink control channel is based on the secondary coverage enhancement procedure, where the secondary coverage enhancement procedure is to use different or additional resources relative to the default coverage enhancement procedure. In some cases, a payload size of UCI or an uplink control format of the uplink control channel is based on the secondary coverage enhancement procedure, where the secondary coverage enhancement procedure is to use a smaller payload size or different uplink control format relative to the default coverage enhancement procedure.

Figure 11:
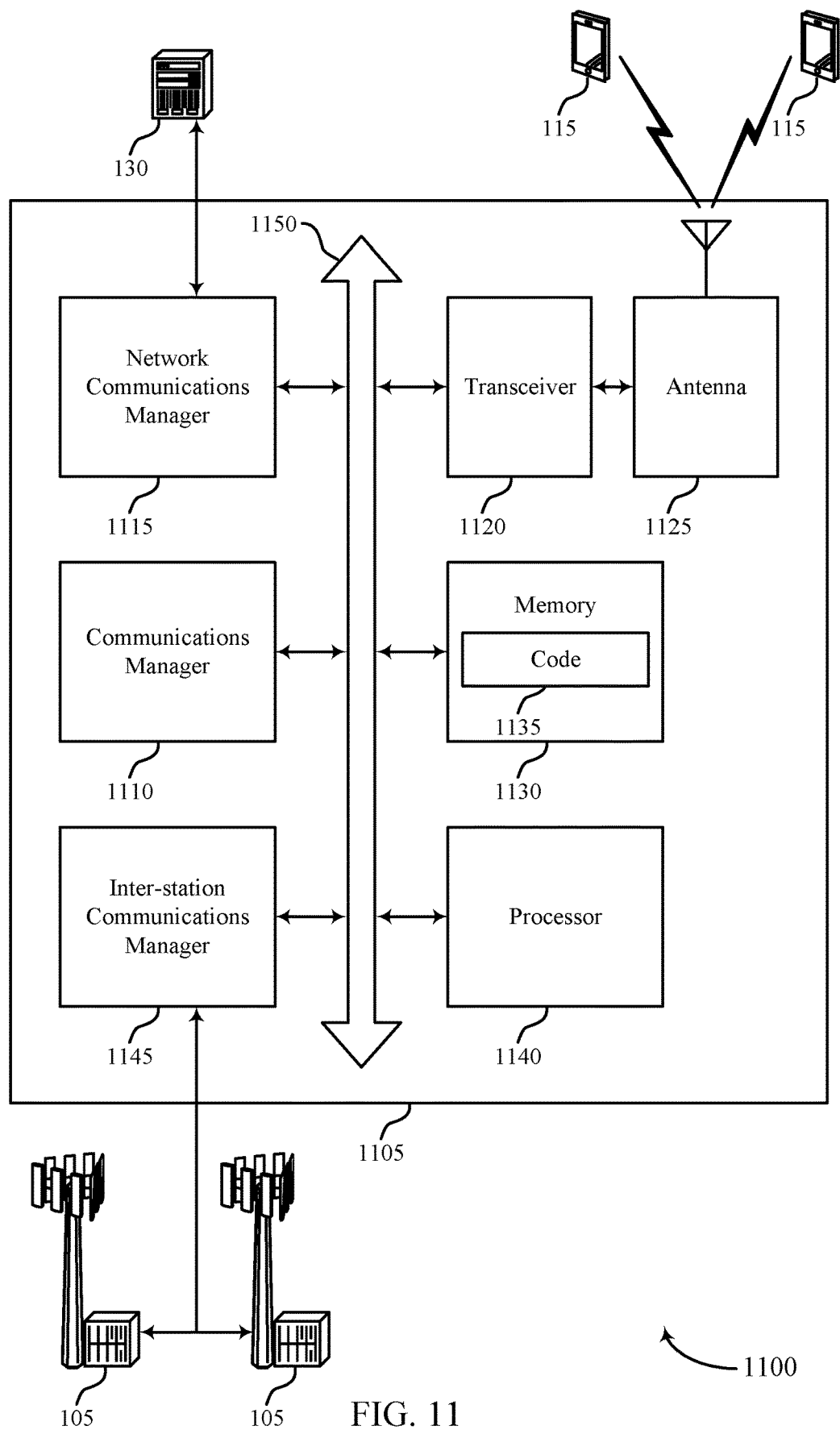
FIG. 11 shows a diagram of a system including a device that supports group common control for coverage enhancement for uplink control channel in accordance with aspects of the present disclosure.

FIG. 11 shows a diagram of a system 1100 including a device 1105 that supports group common control for coverage enhancement for uplink control channel in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel, and transmit a configuration indicating the set of coverage enhancement procedures to the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting group common control for coverage enhancement for uplink control channel).

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
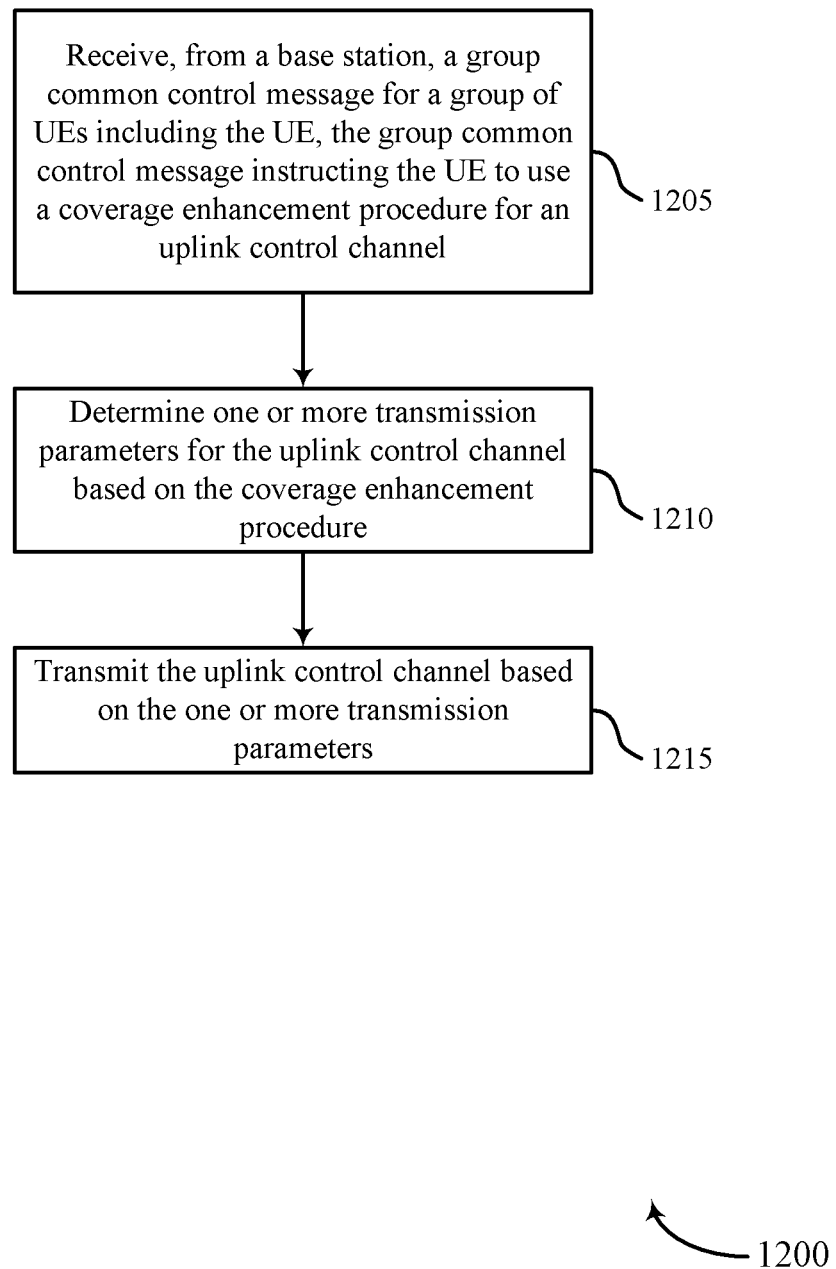
FIGS. 12 through 19 show flowcharts illustrating methods that support group common control for coverage enhancement for uplink control channel in accordance with aspects of the present disclosure.

FIG. 12 shows a flowchart illustrating a method 1200 that supports group common control for coverage enhancement for uplink control channel in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1205, the UE may receive, from a base station, a group common control message for a group of UEs including the UE, the group common control message instructing the UE to use a coverage enhancement procedure for an uplink control channel. The operations of 1205 may be performed according to the methods described herein. In some examples, aspects of the operations of 1205 may be performed by a control message receiver as described with reference to FIGS. 4 through 7.

At 1210, the UE may determine one or more transmission parameters for the uplink control channel based on the coverage enhancement procedure. The operations of 1210 may be performed according to the methods described herein. In some examples, aspects of the operations of 1210 may be performed by a transmission parameters manager as described with reference to FIGS. 4 through 7.

At 1215, the UE may transmit the uplink control channel based on the one or more transmission parameters. The operations of 1215 may be performed according to the methods described herein. In some examples, aspects of the operations of 1215 may be performed by a control channel transmitter as described with reference to FIGS. 4 through 7.

Figure 13:
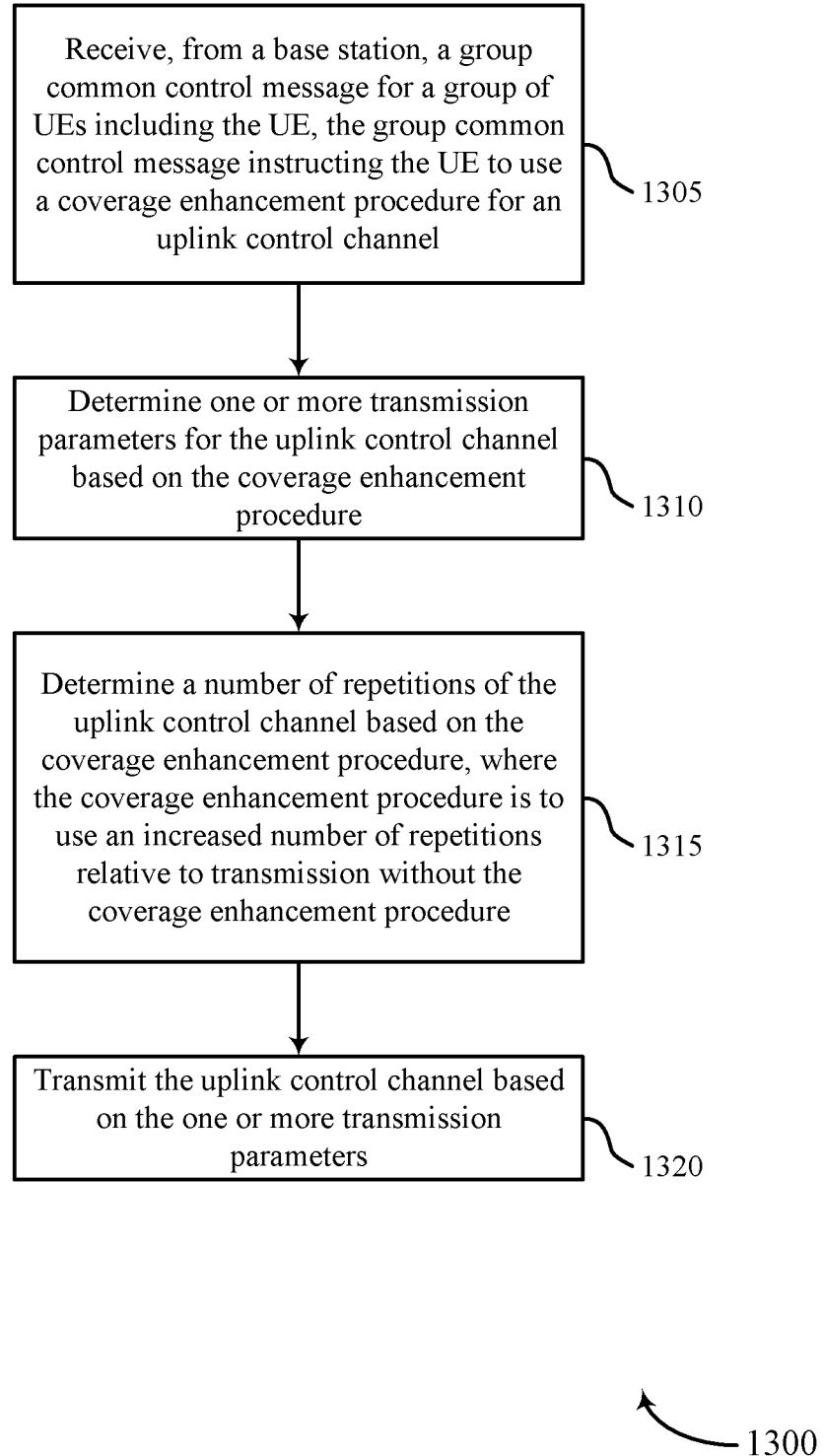

FIG. 13 shows a flowchart illustrating a method 1300 that supports group common control for coverage enhancement for uplink control channel in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1305, the UE may receive, from a base station, a group common control message for a group of UEs including the UE, the group common control message instructing the UE to use a coverage enhancement procedure for an uplink control channel. The operations of 1305 may be performed according to the methods described herein. In some examples, aspects of the operations of 1305 may be performed by a control message receiver as described with reference to FIGS. 4 through 7.

At 1310, the UE may determine one or more transmission parameters for the uplink control channel based on the coverage enhancement procedure. The operations of 1310 may be performed according to the methods described herein. In some examples, aspects of the operations of 1310 may be performed by a transmission parameters manager as described with reference to FIGS. 4 through 7.

At 1315, the UE may determine a number of repetitions of the uplink control channel based on the coverage enhancement procedure, where the coverage enhancement procedure is to use an increased number of repetitions relative to transmission without the coverage enhancement procedure. The operations of 1315 may be performed according to the methods described herein. In some examples, aspects of the operations of 1315 may be performed by a transmission parameters manager as described with reference to FIGS. 4 through 7.

At 1320, the UE may transmit the uplink control channel based on the one or more transmission parameters. The operations of 1320 may be performed according to the methods described herein. In some examples, aspects of the operations of 1320 may be performed by a control channel transmitter as described with reference to FIGS. 4 through 7.

Figure 14:
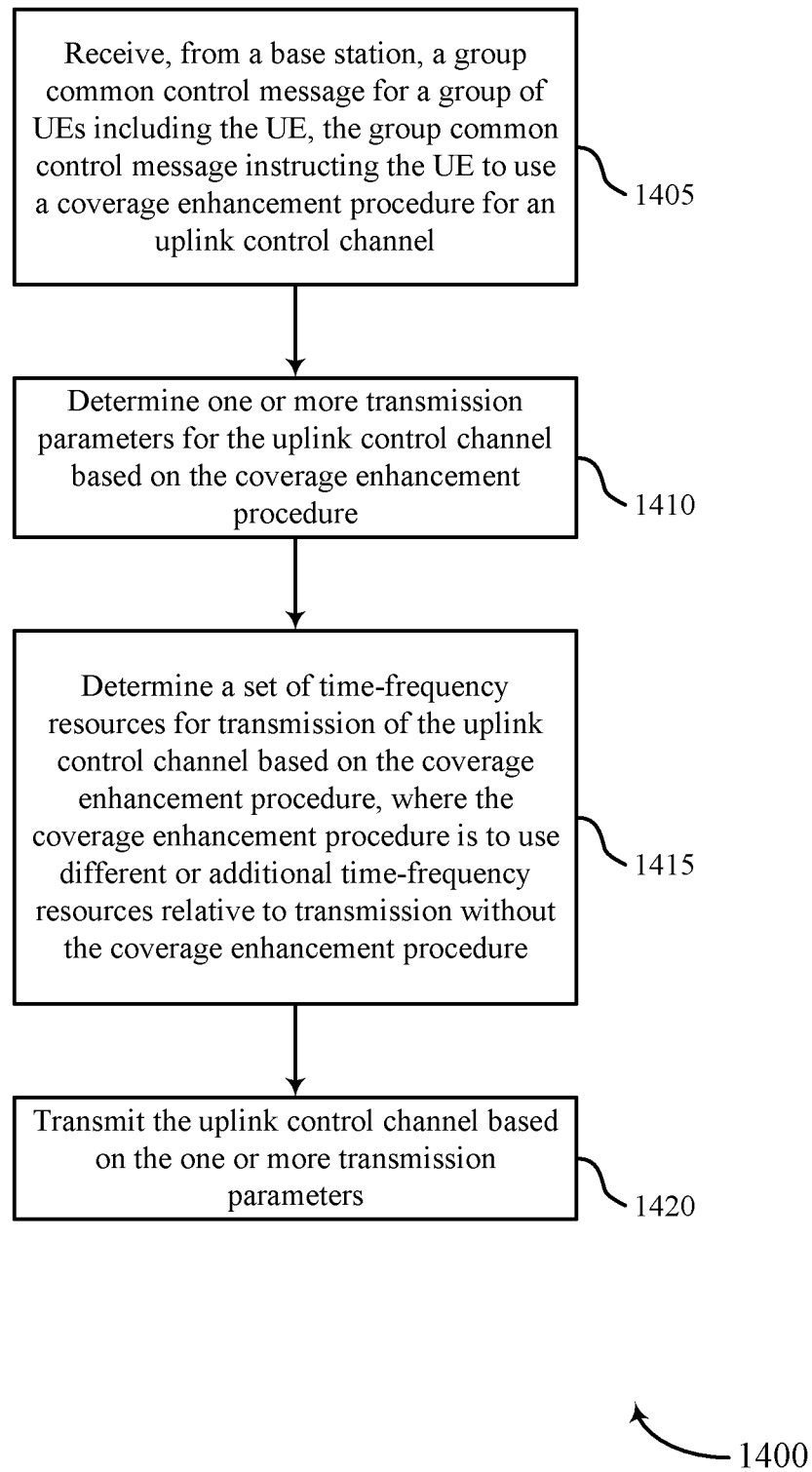

FIG. 14 shows a flowchart illustrating a method 1400 that supports group common control for coverage enhancement for uplink control channel in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1405, the UE may receive, from a base station, a group common control message for a group of UEs including the UE, the group common control message instructing the UE to use a coverage enhancement procedure for an uplink control channel. The operations of 1405 may be performed according to the methods described herein. In some examples, aspects of the operations of 1405 may be performed by a control message receiver as described with reference to FIGS. 4 through 7.

At 1410, the UE may determine one or more transmission parameters for the uplink control channel based on the coverage enhancement procedure. The operations of 1410 may be performed according to the methods described herein. In some examples, aspects of the operations of 1410 may be performed by a transmission parameters manager as described with reference to FIGS. 4 through 7.

At 1415, the UE may determine a set of time-frequency resources for transmission of the uplink control channel based on the coverage enhancement procedure, where the coverage enhancement procedure is to use different or additional time-frequency resources relative to transmission without the coverage enhancement procedure. The operations of 1415 may be performed according to the methods described herein. In some examples, aspects of the operations of 1415 may be performed by a transmission parameters manager as described with reference to FIGS. 4 through 7.

At 1420, the UE may transmit the uplink control channel based on the one or more transmission parameters. The operations of 1420 may be performed according to the methods described herein. In some examples, aspects of the operations of 1420 may be performed by a control channel transmitter as described with reference to FIGS. 4 through 7.

Figure 15:
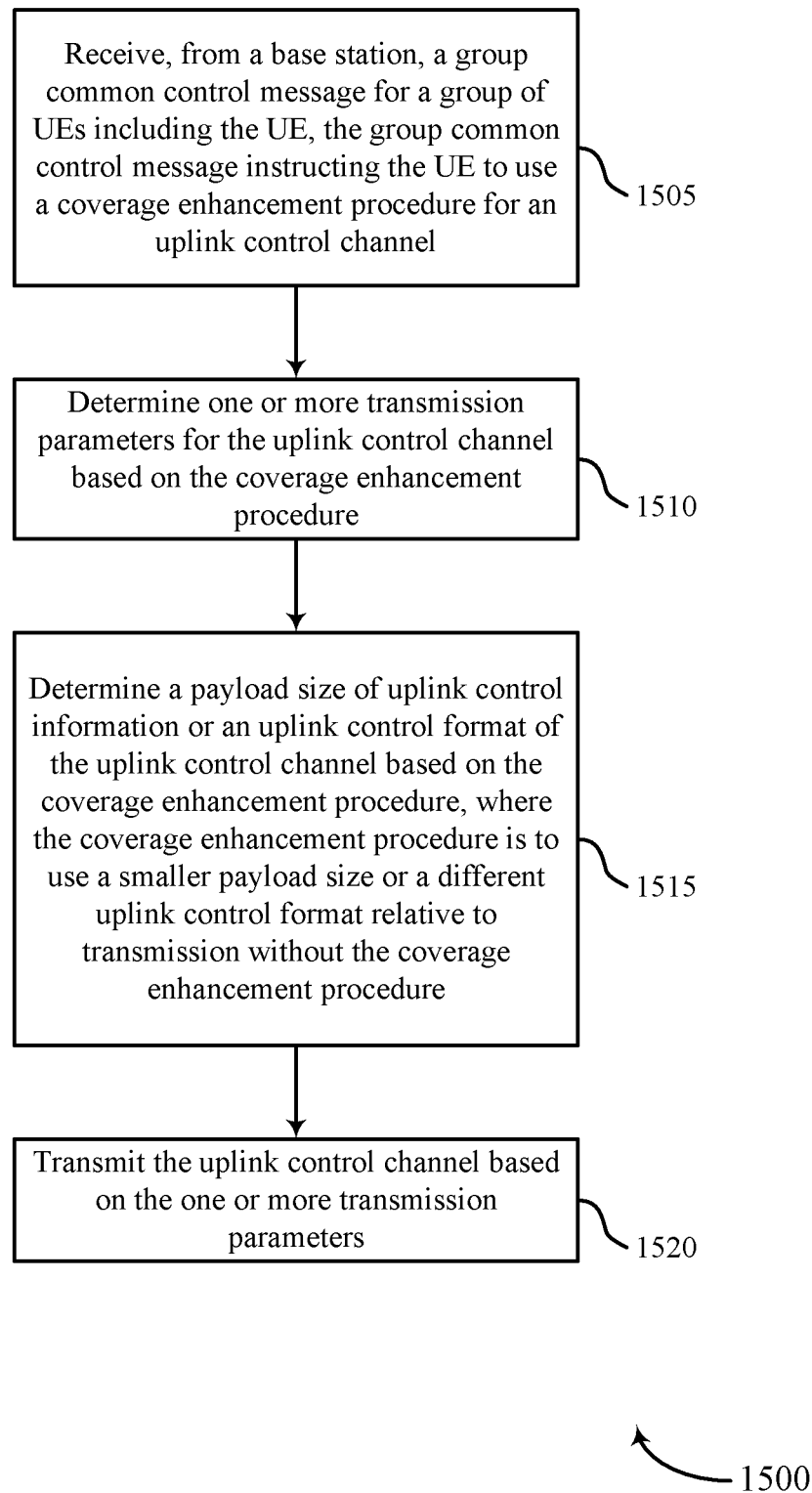

FIG. 15 shows a flowchart illustrating a method 1500 that supports group common control for coverage enhancement for uplink control channel in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1505, the UE may receive, from a base station, a group common control message for a group of UEs including the UE, the group common control message instructing the UE to use a coverage enhancement procedure for an uplink control channel. The operations of 1505 may be performed according to the methods described herein. In some examples, aspects of the operations of 1505 may be performed by a control message receiver as described with reference to FIGS. 4 through 7.

At 1510, the UE may determine one or more transmission parameters for the uplink control channel based on the coverage enhancement procedure. The operations of 1510 may be performed according to the methods described herein. In some examples, aspects of the operations of 1510 may be performed by a transmission parameters manager as described with reference to FIGS. 4 through 7.

At 1515, the UE may determine a payload size of UCI or an uplink control format of the uplink control channel based on the coverage enhancement procedure, where the coverage enhancement procedure is to use a smaller payload size or a different uplink control format relative to transmission without the coverage enhancement procedure. The operations of 1515 may be performed according to the methods described herein. In some examples, aspects of the operations of 1515 may be performed by a transmission parameters manager as described with reference to FIGS. 4 through 7.

At 1520, the UE may transmit the uplink control channel based on the one or more transmission parameters. The operations of 1520 may be performed according to the methods described herein. In some examples, aspects of the operations of 1520 may be performed by a control channel transmitter as described with reference to FIGS. 4 through 7.

Figure 16:
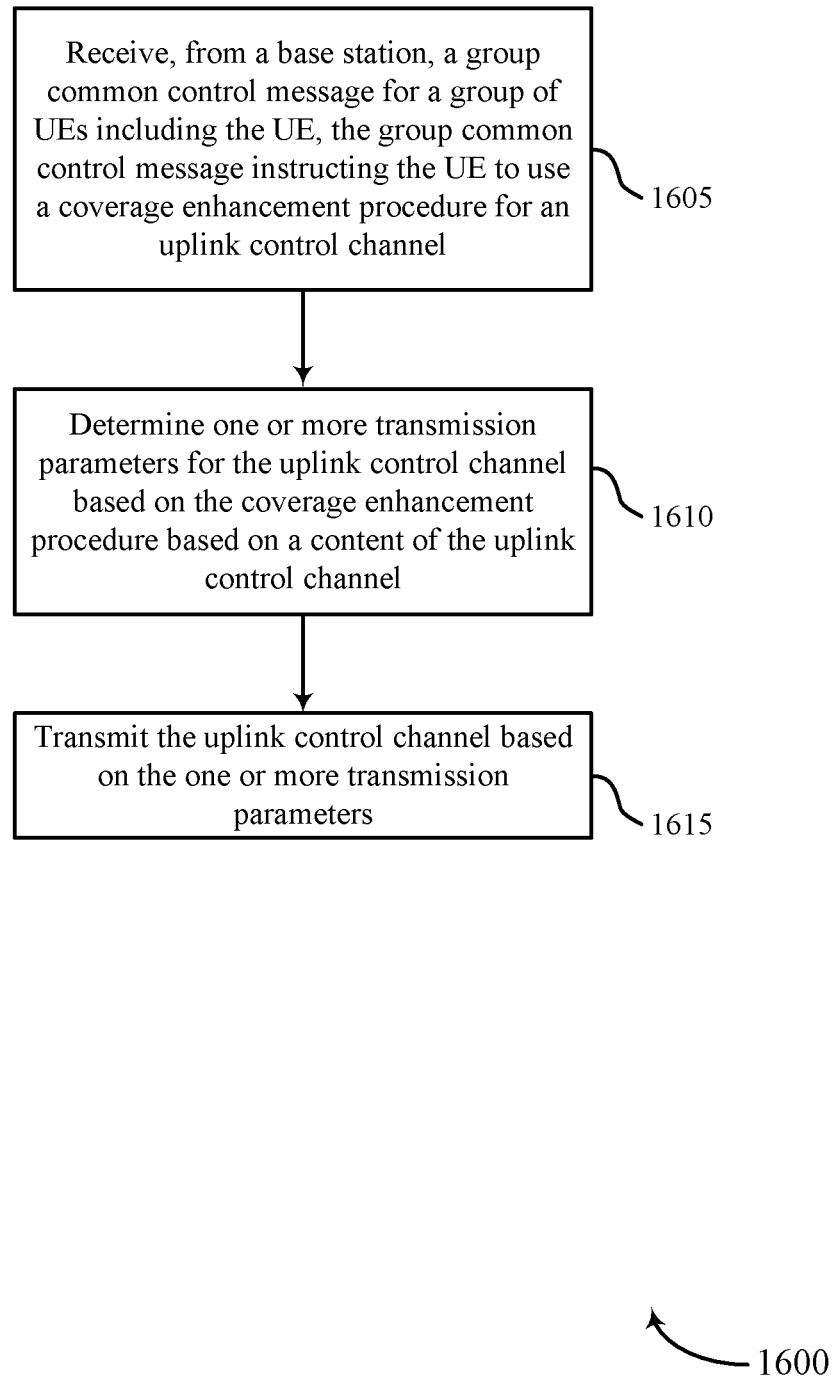

FIG. 16 shows a flowchart illustrating a method 1600 that supports group common control for coverage enhancement for uplink control channel in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1605, the UE may receive, from a base station, a group common control message for a group of UEs including the UE, the group common control message instructing the UE to use a coverage enhancement procedure for an uplink control channel. The operations of 1605 may be performed according to the methods described herein. In some examples, aspects of the operations of 1605 may be performed by a control message receiver as described with reference to FIGS. 4 through 7.

At 1610, the UE may determine one or more transmission parameters for the uplink control channel based on the coverage enhancement procedure based on a content of the uplink control channel. The operations of 1610 may be performed according to the methods described herein. In some examples, aspects of the operations of 1610 may be performed by a transmission parameters manager as described with reference to FIGS. 4 through 7.

At 1615, the UE may transmit the uplink control channel based on the one or more transmission parameters. The operations of 1615 may be performed according to the methods described herein. In some examples, aspects of the operations of 1615 may be performed by a control channel transmitter as described with reference to FIGS. 4 through 7.

Figure 17:
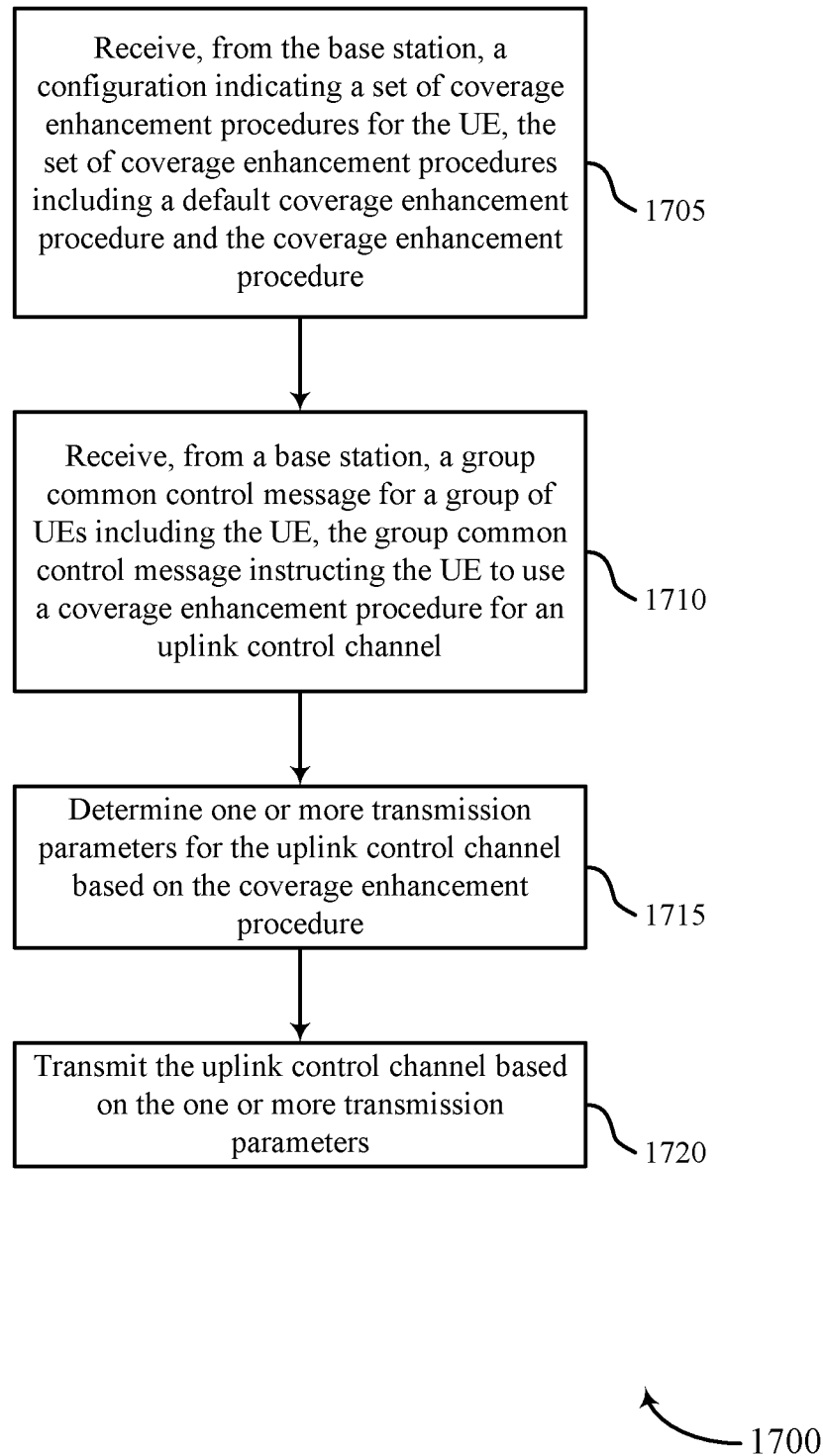

FIG. 17 shows a flowchart illustrating a method 1700 that supports group common control for coverage enhancement for uplink control channel in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally, or alternatively, a UE may perform aspects of the functions described herein using special-purpose hardware.

At 1705, the UE may receive, from the base station, a configuration indicating a set of coverage enhancement procedures for the UE, the set of coverage enhancement procedures including a default coverage enhancement procedure and the coverage enhancement procedure. The operations of 1705 may be performed according to the methods described herein. In some examples, aspects of the operations of 1705 may be performed by a configuration receiver as described with reference to FIGS. 4 through 7.

At 1710, the UE may receive, from a base station, a group common control message for a group of UEs including the UE, the group common control message instructing the UE to use a coverage enhancement procedure for an uplink control channel. The operations of 1710 may be performed according to the methods described herein. In some examples, aspects of the operations of 1710 may be performed by a control message receiver as described with reference to FIGS. 4 through 7.

At 1715, the UE may determine one or more transmission parameters for the uplink control channel based on the coverage enhancement procedure. The operations of 1715 may be performed according to the methods described herein. In some examples, aspects of the operations of 1715 may be performed by a transmission parameters manager as described with reference to FIGS. 4 through 7.

At 1720, the UE may transmit the uplink control channel based on the one or more transmission parameters. The operations of 1720 may be performed according to the methods described herein. In some examples, aspects of the operations of 1720 may be performed by a control channel transmitter as described with reference to FIGS. 4 through 7.

Figure 18:
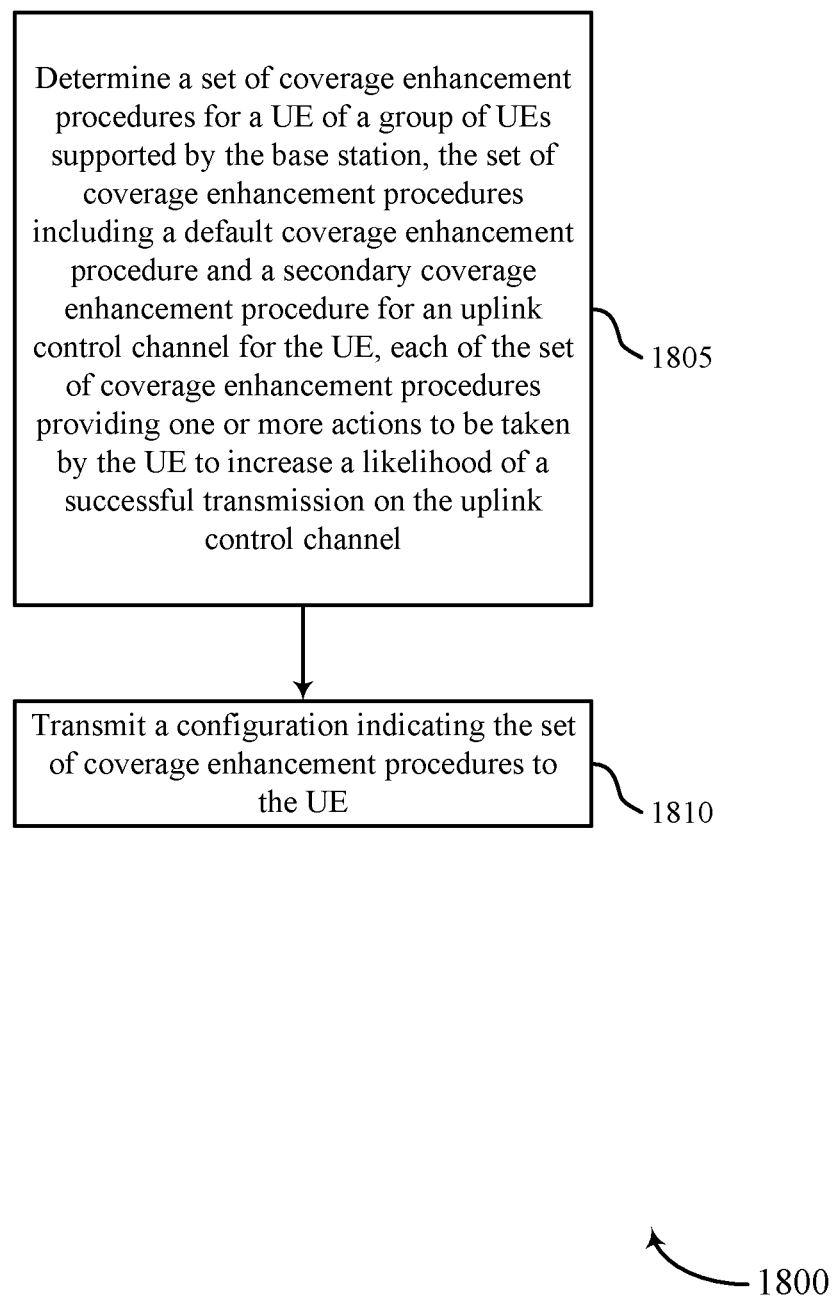

FIG. 18 shows a flowchart illustrating a method 1800 that supports group common control for coverage enhancement for uplink control channel in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally, or alternatively, a base station may perform aspects of the functions described herein using special-purpose hardware.

At 1805, the base station may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel. The operations of 1805 may be performed according to the methods described herein. In some examples, aspects of the operations of 1805 may be performed by a coverage enhancement manager as described with reference to FIGS. 8 through 11.

At 1810, the base station may transmit a configuration indicating the set of coverage enhancement procedures to the UE. The operations of 1810 may be performed according to the methods described herein. In some examples, aspects of the operations of 1810 may be performed by a configuration transmitter as described with reference to FIGS. 8 through 11.

Figure 19:
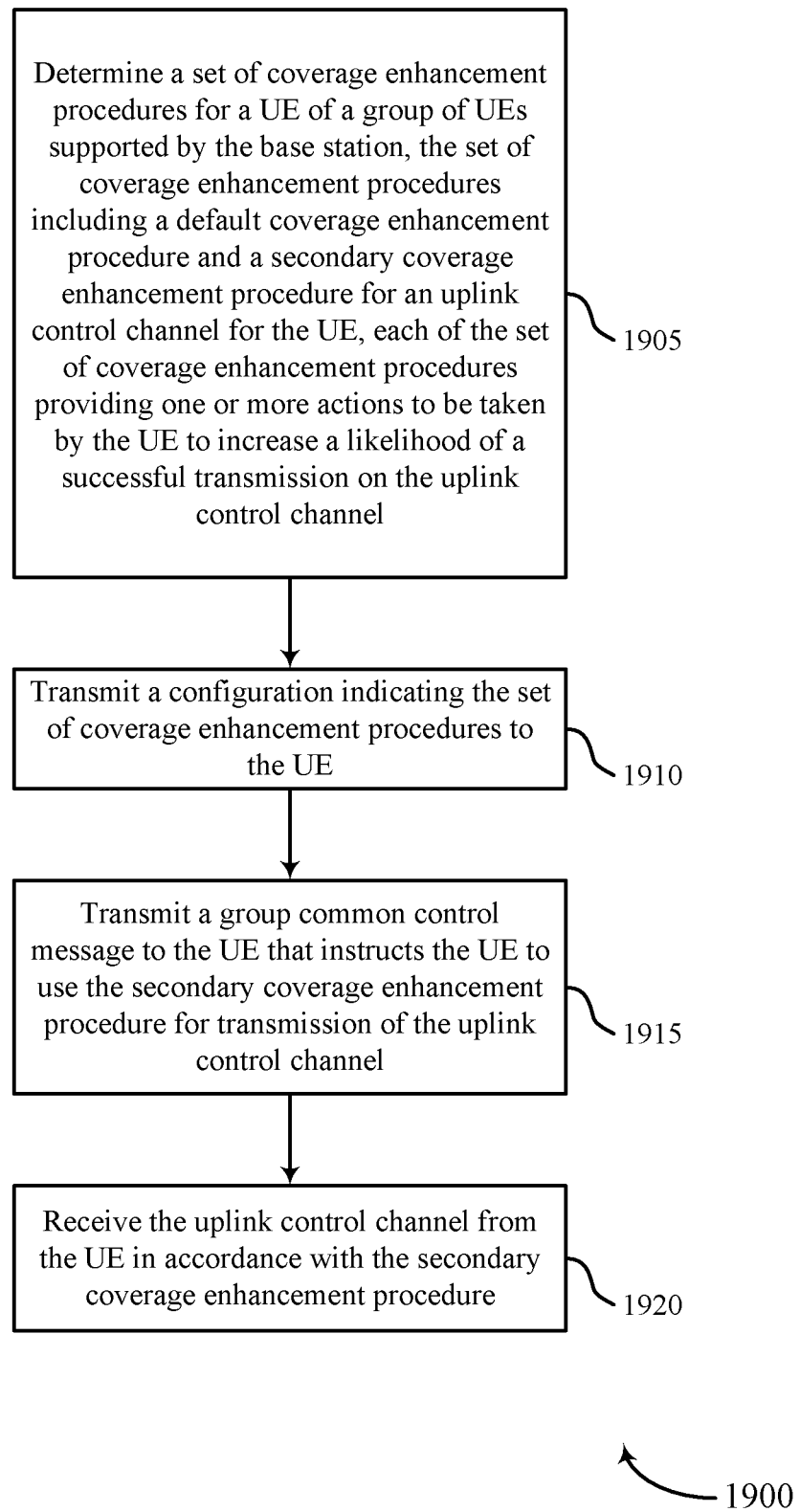

FIG. 19 shows a flowchart illustrating a method 1900 that supports group common control for coverage enhancement for uplink control channel in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described herein. Additionally, or alternatively, a base station may perform aspects of the functions described herein using special-purpose hardware.

At 1905, the base station may determine a set of coverage enhancement procedures for a UE of a group of UEs supported by the base station, the set of coverage enhancement procedures including a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel. The operations of 1905 may be performed according to the methods described herein. In some examples, aspects of the operations of 1905 may be performed by a coverage enhancement manager as described with reference to FIGS. 8 through 11.

At 1910, the base station may transmit a configuration indicating the set of coverage enhancement procedures to the UE. The operations of 1910 may be performed according to the methods described herein. In some examples, aspects of the operations of 1910 may be performed by a configuration transmitter as described with reference to FIGS. 8 through 11.

At 1915, the base station may transmit a group common control message to the UE that instructs the UE to use the secondary coverage enhancement procedure for transmission of the uplink control channel. The operations of 1915 may be performed according to the methods described herein. In some examples, aspects of the operations of 1915 may be performed by a control message transmitter as described with reference to FIGS. 8 through 11.

At 1920, the base station may receive the uplink control channel from the UE in accordance with the secondary coverage enhancement procedure. The operations of 1920 may be performed according to the methods described herein. In some examples, aspects of the operations of 1920 may be performed by a control channel receiver as described with reference to FIGS. 8 through 11.

The following provides an overview of aspects of the present disclosure:

Aspect 1: A method for wireless communications at a UE, comprising: receiving, from a base station, a group common control message for a group of UEs comprising the UE, the group common control message instructing the UE to use a coverage enhancement procedure for an uplink control channel; determining one or more transmission parameters for the uplink control channel based at least in part on the coverage enhancement procedure; and transmitting the uplink control channel based at least in part on the one or more transmission parameters.

Aspect 2: The method of aspect 1, wherein determining one or more transmission parameters comprises: determining a number of repetitions of the uplink control channel based at least in part on the coverage enhancement procedure, wherein the coverage enhancement procedure is to use an increased number of repetitions relative to transmission without the coverage enhancement procedure.

Aspect 3: The method of any of aspects 1 through 2, wherein determining one or more transmission parameters comprises: determining a set of time-frequency resources for transmission of the uplink control channel based at least in part on the coverage enhancement procedure, wherein the coverage enhancement procedure is to use different or additional time-frequency resources relative to transmission without the coverage enhancement procedure.

Aspect 4: The method of any of aspects 1 through 3, wherein determining one or more transmission parameters comprises: determining a payload size of UCI or an uplink control format of the uplink control channel based at least in part on the coverage enhancement procedure, wherein the coverage enhancement procedure is to use a smaller payload size or a different uplink control format relative to transmission without the coverage enhancement procedure.

Aspect 5: The method of any of aspects 1 through 4, wherein determining one or more transmission parameters comprises: determining the one or more transmission parameters based at least in part on a content of the uplink control channel.

Aspect 6: The method of aspect 5, further comprising: determining a number of repetitions of the uplink control channel based at least in part on the content of the uplink control channel, wherein the content of the uplink control channel comprises an acknowledgement of a beam change, a scheduling request, or any combination thereof, and wherein the coverage enhancement procedure is to use an increased number of repetitions relative to transmission without the coverage enhancement procedure.

Aspect 7: The method of any of aspects 5 through 6, further comprising: determining a number of repetitions of the uplink control channel based at least in part on the content of the uplink control channel, wherein the content of the uplink control channel is associated with a semi-persistent scheduling configuration.

Aspect 8: The method of aspect 7, further comprising: determining a set of time-frequency resources for transmission of the uplink control channel based at least in part on a priority of the semi-persistent scheduling configuration, wherein the coverage enhancement procedure is to use different or additional time-frequency resources relative to transmission without the coverage enhancement procedure.

Aspect 9: The method of any of aspects 1 through 8, further comprising: receiving, from the base station, a configuration indicating a set of coverage enhancement procedures for the UE, the set of coverage enhancement procedures comprising a default coverage enhancement procedure and the coverage enhancement procedure.

Aspect 10: The method of aspect 9, further comprising: transmitting a second uplink control channel in accordance with the default coverage enhancement procedure prior to receiving the group common control message.

Aspect 11: The method of any of aspects 9 through 10, wherein the configuration is received via RRC signaling.

Aspect 12: The method of any of aspects 1 through 11, wherein the group common control message comprises group common DCI.

Aspect 13: A method for wireless communications at a base station, comprising: determining a set of coverage enhancement procedures for a UE of a group of UEs supported by the base station, the set of coverage enhancement procedures comprising a default coverage enhancement procedure and a secondary coverage enhancement procedure for an uplink control channel for the UE, each of the set of coverage enhancement procedures providing one or more actions to be taken by the UE to increase a likelihood of a successful transmission on the uplink control channel; and transmitting a configuration indicating the set of coverage enhancement procedures to the UE.

Aspect 14: The method of aspect 13, further comprising: transmitting a group common control message to the UE that instructs the UE to use the secondary coverage enhancement procedure for transmission of the uplink control channel; and receiving the uplink control channel from the UE in accordance with the secondary coverage enhancement procedure.

Aspect 15: The method of aspect 14, further comprising: receiving a number of repetitions of the uplink control channel from the UE based at least in part on the secondary coverage enhancement procedure, wherein the secondary coverage enhancement procedure is to use an increased number of repetitions relative to the default coverage enhancement procedure.

Aspect 16: The method of aspect 15, wherein the number of repetitions of the uplink control channel is based at least in part on a content of the uplink control channel, and the content is associated with a semi-persistent scheduling configuration or comprises an acknowledgement of a beam change, a scheduling request, or any combination thereof Aspect 17: The method of any of aspects 14 through 16, wherein a set of time-frequency resources for reception of the uplink control channel is based at least in part on the secondary coverage enhancement procedure, and the secondary coverage enhancement procedure is to use different or additional resources relative to the default coverage enhancement procedure.

Aspect 18: The method of any of aspects 14 through 17, wherein a payload size of UCI or an uplink control format of the uplink control channel is based at least in part on the secondary coverage enhancement procedure, the secondary coverage enhancement procedure is to use a smaller payload size or different uplink control format relative to the default coverage enhancement procedure.

Aspect 19: The method of any of aspects 13 through 18, wherein transmitting the configuration comprises: transmitting an RRC message that comprises the configuration.

Aspect 20: An apparatus for wireless communications at a UE, comprising a processor; memory coupled with the processor; and instructions stored in the memory and executable by the processor to cause the apparatus to perform a method of any of aspects 1 through 12.

Aspect 21: An apparatus for wireless communications at a UE, comprising at least one means for performing a method of any of aspects 1 through 12.

Aspect 22: A non-transitory computer-readable medium storing code for wireless communications at a UE, the code comprising instructions executable by a processor to perform a method of any of aspects 1 through 12.

Aspect 23: An apparatus for wireless communications at a base station, comprising a processor; memory coupled with the processor; and instructions stored in the memory and executable by the processor to cause the apparatus to perform a method of any of aspects 13 through 19.

Aspect 24: An apparatus for wireless communications at a base station, comprising at least one means for performing a method of any of aspects 13 through 19.

Aspect 25: A non-transitory computer-readable medium storing code for wireless communications at a base station, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, based at least in part on a determination that a beam used for communication between a network entity and the UE is temporarily compromised, group common downlink control information instructing the UE to use a coverage enhancement procedure for an uplink control channel, wherein the group common downlink control information is associated with a group of UEs that includes the UE and that uses the beam; and
   transmitting an uplink message via the uplink control channel using one or more transmission parameters associated with the coverage enhancement procedure indicated by the group common downlink control information.

2. The method of claim 1, further comprising:
   determining a number of repetitions of the uplink message based at least in part on the coverage enhancement procedure, wherein the coverage enhancement procedure is to use an increased number of repetitions relative to transmission without the coverage enhancement procedure.

3. The method of claim 1, further comprising:
   determining a set of time-frequency resources for transmission of the uplink message based at least in part on the coverage enhancement procedure, wherein the coverage enhancement procedure is to use different or additional time-frequency resources relative to transmission without the coverage enhancement procedure.

4. The method of claim 1, further comprising:
   determining a payload size of the uplink message based at least in part on the coverage enhancement procedure, wherein the coverage enhancement procedure is to use a smaller payload size relative to transmission without the coverage enhancement procedure.

5. The method of claim 1, further comprising:
   determining the one or more transmission parameters based at least in part on a content of the uplink message.

6. The method of claim 5, further comprising:
   determining a number of repetitions of the uplink message based at least in part on the content of the uplink message, wherein the content of the uplink message comprises an acknowledgement of a beam change, a scheduling request, or any combination thereof, and wherein the coverage enhancement procedure is to use an increased number of repetitions relative to transmission without the coverage enhancement procedure.

7. The method of claim 5, further comprising:
   determining a number of repetitions of the uplink message based at least in part on the content of the uplink message, wherein the content of the uplink message is associated with a semi-persistent scheduling configuration.

8. The method of claim 7, further comprising:
   determining a set of time-frequency resources for transmission of the uplink message based at least in part on a priority of the semi-persistent scheduling configuration, wherein the coverage enhancement procedure is to use different or additional time-frequency resources relative to transmission without the coverage enhancement procedure.

9. The method of claim 1, further comprising:
   receiving a configuration indicating a set of coverage enhancement procedures for the UE, the set of coverage enhancement procedures comprising a default coverage enhancement procedure and the coverage enhancement procedure.

10. The method of claim 9, further comprising:
    transmitting a second uplink message in accordance with the default coverage enhancement procedure prior to receiving the group common downlink control information.

11. The method of claim 9, wherein the configuration is received via radio resource control (RRC) signaling.

12. A method for wireless communications at a network entity, comprising:
    transmitting an indication of a configuration for a set of coverage enhancement procedures that pertain to uplink control channels, the set of coverage enhancement procedures comprising at least a default coverage enhancement procedure and a secondary coverage enhancement procedure; and
    transmitting, based at least in part on a determination that a beam used for communication between the network entity and a group of user equipments (UEs) is temporarily compromised, group common downlink control information that instructs one or more UEs of the group of UEs to use the secondary coverage enhancement procedure for an uplink message via an uplink control channel.

13. The method of claim 12, further comprising:
receiving the uplink message from a UE of the group of UEs in accordance with the secondary coverage enhancement procedure.

14. The method of claim 13, further comprising:
receiving a number of repetitions of the uplink message from the UE based at least in part on the secondary coverage enhancement procedure, wherein the secondary coverage enhancement procedure is to use an increased number of repetitions relative to the default coverage enhancement procedure.

15. The method of claim 14, wherein the number of repetitions of the uplink message is based at least in part on a content of the uplink message, and wherein the content is associated with a semi-persistent scheduling configuration or comprises an acknowledgement of a beam change, a scheduling request, or any combination thereof.

16. The method of claim 13, wherein a set of time-frequency resources for reception of the uplink message is based at least in part on the secondary coverage enhancement procedure, and wherein the secondary coverage enhancement procedure is to use different or additional resources relative to the default coverage enhancement procedure.

17. The method of claim 13, wherein a payload size of uplink control information (UCI) or an uplink control format of the uplink message is based at least in part on the secondary coverage enhancement procedure, wherein the secondary coverage enhancement procedure is to use a smaller payload size or different uplink control format relative to the default coverage enhancement procedure.

18. The method of claim 12, wherein transmitting the indication of the configuration comprises:
transmitting a radio resource control (RRC) message that comprises the configuration.

19. An apparatus for wireless communications at a user equipment (UE), comprising:
a processor,
memory coupled with the processor; and
instructions stored in the memory and executable by the processor to cause the apparatus to:
receive, based at least in part on a determination that a beam used for communication between a network entity and the UE is temporarily compromised, group common downlink control information instructing the UE to use a coverage enhancement procedure for an uplink control channel, wherein the group common downlink control information is associated with a group of UEs that includes the UE and that uses the beam; and
transmit an uplink message via the uplink control channel using one or more transmission parameters associated with the coverage enhancement procedure indicated by the group common downlink control information.

20. The apparatus of claim 19, wherein the instructions are further executable by the processor to cause the apparatus to:
determine a number of repetitions of the uplink message based at least in part on the coverage enhancement procedure, wherein the coverage enhancement procedure is to use an increased number of repetitions relative to transmission without the coverage enhancement procedure.

21. The apparatus of claim 19, wherein the instructions are further executable by the processor to cause the apparatus to:
determine a set of time-frequency resources for transmission of the uplink message based at least in part on the coverage enhancement procedure, wherein the coverage enhancement procedure is to use different or additional time-frequency resources relative to transmission without the coverage enhancement procedure.

22. The apparatus of claim 19, wherein the instructions are further executable by the processor to cause the apparatus to:
determine a payload size of the uplink message based at least in part on the coverage enhancement procedure, wherein the coverage enhancement procedure is to use a smaller payload size relative to transmission without the coverage enhancement procedure.

23. The apparatus of claim 19, wherein the instructions are further executable by the processor to cause the apparatus to:
determine the one or more transmission parameters based at least in part on a content of the uplink message.

24. The apparatus of claim 23, wherein the instructions are further executable by the processor to cause the apparatus to:
determine a number of repetitions of the uplink message based at least in part on the content of the uplink message, wherein the content of the uplink message comprises an acknowledgement of a beam change, a scheduling request, or any combination thereof, wherein the coverage enhancement procedure is to use an increased number of repetitions relative to transmission without the coverage enhancement procedure.

25. The apparatus of claim 23, wherein the instructions are further executable by the processor to cause the apparatus to:
determine a number of repetitions of the uplink message based at least in part on the content of the uplink message, wherein the content of the uplink message is associated with a semi-persistent scheduling configuration.

26. The apparatus of claim 25, wherein the instructions are further executable by the processor to cause the apparatus to:
determine a set of time-frequency resources for transmission of the uplink message based at least in part on a priority of the semi-persistent scheduling configuration, wherein the coverage enhancement procedure is to use different or additional time-frequency resources relative to transmission without the coverage enhancement procedure.

27. The apparatus of claim 19, wherein the instructions are further executable by the processor to cause the apparatus to:
receive a configuration indicating a set of coverage enhancement procedures for the UE, the set of coverage enhancement procedures comprising a default coverage enhancement procedure and the coverage enhancement procedure.

28. The apparatus of claim 27, wherein the instructions are further executable by the processor to cause the apparatus to:
transmit a second uplink message in accordance with the default coverage enhancement procedure prior to receiving the group common downlink control information.

29. An apparatus for wireless communications at a network entity, comprising:
a processor,
memory coupled with the processor; and
instructions stored in the memory and executable by the processor to cause the apparatus to:
transmit an indication of a configuration for a set of coverage enhancement procedures that pertain to uplink control channels, the set of coverage enhancement procedures comprising at least a default coverage enhancement procedure and a secondary coverage enhancement procedure; and
transmit, based at least in part on a determination that a beam used for communication between the network entity and a group of user equipments (UEs) is temporarily compromised, group common downlink control information that instructs one or more UEs of the group of UEs to use the secondary coverage enhancement procedure for an uplink message via an uplink control channel.

* * * * *